US012076994B2

(12) United States Patent
Eto et al.

(10) Patent No.: US 12,076,994 B2
(45) Date of Patent: Sep. 3, 2024

(54) INKJET RECORDING DEVICE

(71) Applicant: KYOCERA CORPORATION, Kyoto (JP)

(72) Inventors: Daisuke Eto, Kyoto (JP); Masahiro Higashitani, Kyoto (JP); Hiroatsu Tamai, Kyoto (JP); Masaaki Maruta, Kyoto (JP); Tomoya Hotani, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 18/546,971

(22) PCT Filed: Feb. 18, 2022

(86) PCT No.: PCT/JP2022/006777

§ 371 (c)(1),
(2) Date: Aug. 18, 2023

(87) PCT Pub. No.: WO2022/181501

PCT Pub. Date: Sep. 1, 2022

(65) Prior Publication Data

US 2024/0042761 A1 Feb. 8, 2024

(30) Foreign Application Priority Data

Feb. 24, 2021 (JP) ................................ 2021-027685

(51) Int. Cl.
*B41J 2/14* (2006.01)
*B41J 2/15* (2006.01)
*B41J 2/21* (2006.01)

(52) U.S. Cl.
CPC ............... *B41J 2/1433* (2013.01); *B41J 2/15* (2013.01); *B41J 2/2103* (2013.01)

(58) Field of Classification Search
CPC ........... B41J 2/1433; B41J 2/15; B41J 2/2103
See application file for complete search history.

(56) References Cited

U.S. PATENT DOCUMENTS

2005/0012780 A1* 1/2005 Gil ......................... B41J 2/2103 347/43
2005/0179725 A1 8/2005 Matsushima
(Continued)

FOREIGN PATENT DOCUMENTS

CN 104309309 A 1/2015
JP 2005254806 A 9/2005
(Continued)

*Primary Examiner* — Jason S Uhlenhake
(74) *Attorney, Agent, or Firm* — HAUPTMAN HAM, LLP

(57) ABSTRACT

An inkjet recording device includes a conveyance unit, a carriage, one or a plurality of ink heads, a pre-processing head, and a post-processing head. The conveyance unit is configured to convey a recording medium in a conveyance direction. The carriage is configured to reciprocate in a main scanning direction intersecting the conveyance direction. The plurality of ink heads is located on the carriage and each eject an ink. The pre-processing head is arranged upstream of the plurality of ink heads in the conveyance direction and ejects a non-colored pre-processing solution. The post-processing head is arranged downstream of the plurality of ink heads in the conveyance direction and ejects a non-colored post-processing solution. The plurality of ink heads includes a plurality of same-color ink heads arranged to align in the conveyance direction to eject a same-color ink.

21 Claims, 21 Drawing Sheets

(56) References Cited

U.S. PATENT DOCUMENTS

| | | | |
|---|---|---|---|
| 2015/0165765 A1 | 6/2015 | Chang | |
| 2015/0231892 A1 | 8/2015 | Mochizuki et al. | |
| 2015/0328911 A1* | 11/2015 | Garcia Maza | B41J 2/2114 347/37 |
| 2018/0304625 A1 | 10/2018 | Kayahara et al. | |
| 2019/0264056 A1 | 8/2019 | Okuda et al. | |

FOREIGN PATENT DOCUMENTS

| | | |
|---|---|---|
| JP | 2012125951 A | 7/2012 |
| JP | 2012131155 A | 7/2012 |
| JP | 2014083804 A | 5/2014 |
| JP | 2018001674 A | 1/2018 |
| JP | 2019147307 A | 9/2019 |
| JP | 2020131548 A | 8/2020 |

* cited by examiner

INKJET RECORDING DEVICE

RELATED APPLICATIONS

The present application is a National Phase of International Application Number PCT/JP2022/006777 filed Feb. 18, 2022, which claims the benefit of priority from Japanese Patent Application No. 2021-027685, filed on Feb. 24, 2021.

TECHNICAL FIELD

The present disclosure relates to an inkjet recording device including ink heads located on a carriage that moves in the main scanning direction.

BACKGROUND ART

An inkjet recording device such as an inkjet printer includes an ink head that ejects an ink for image formation toward a recording medium. For example, when the recording medium is a fiber sheet such as a woven or knitted fabric or a plastic sheet, it may be necessary to apply a pre-processing solution or post-processing solution to the recording medium before and after the ink is ejected toward the recording medium (for example, Patent Literature 1). The pre-processing solution is, for example, a processing solution for improving fixability of the ink to the recording medium and cohesiveness of ink pigments. The post-processing solution is, for example, a processing solution that enhances fastness of a printed image. In this case, the inkjet recording device includes processing heads that eject the pre-processing solution and the post-processing solution, in addition to the ink head.

When the recording medium is wide, the ink head and each processing head are mounted on a carriage that reciprocates in the main scanning direction. During the recording process, the recording medium is intermittently fed in a prescribed conveyance direction (sub scanning direction), and the carriage is reciprocated in the main scanning direction while the recording medium is stopped. When the carriage moves, the ink and the processing solutions are ejected from the ink head and the processing heads, respectively.

CITATION LIST

Patent Literature

Patent Literature 1: Japanese Unexamined Patent Publication No. 2019-147307

SUMMARY OF INVENTION

An inkjet recording device according to one aspect of the present disclosure includes a conveyance unit, a carriage, one or a plurality of ink heads, at least one pre-processing head, and at least one post-processing head. The conveyance unit is configured to convey a recording medium in a conveyance direction. The carriage is configured to reciprocate in a main scanning direction intersecting the conveyance direction. The plurality of ink heads is located on the carriage and each ink head is configured to eject an ink. The at least one pre-processing head is arranged upstream of the plurality of ink heads in the conveyance direction and configured to eject a non-colored pre-processing solution. The at least one post-processing head is arranged downstream of the plurality of ink heads in the conveyance direction and configured to eject a non-colored post-processing solution. The plurality of ink heads includes a plurality of same-color ink heads arranged to align in the conveyance direction and configured to eject a same-color ink.

DESCRIPTION OF EMBODIMENTS

An inkjet recording device according to each embodiment of the present disclosure will be described below with reference to the drawings. In these embodiments, as a specific example of the inkjet recording device, an inkjet printer including ink heads that eject an ink for image formation on a wide, long recording medium is exemplified. The inkjet printer is suitable for digital textile printing in which images such as letters and patterns are printed by an inkjet method on a recording medium including fabrics such as woven and knitted fabrics. Of course, the inkjet recording device according to the present disclosure can also be used for usage of printing various inkjet images on a recording medium such as paper sheets and resin sheets.

[Overall Configuration of Inkjet Printer]

Figure 1:
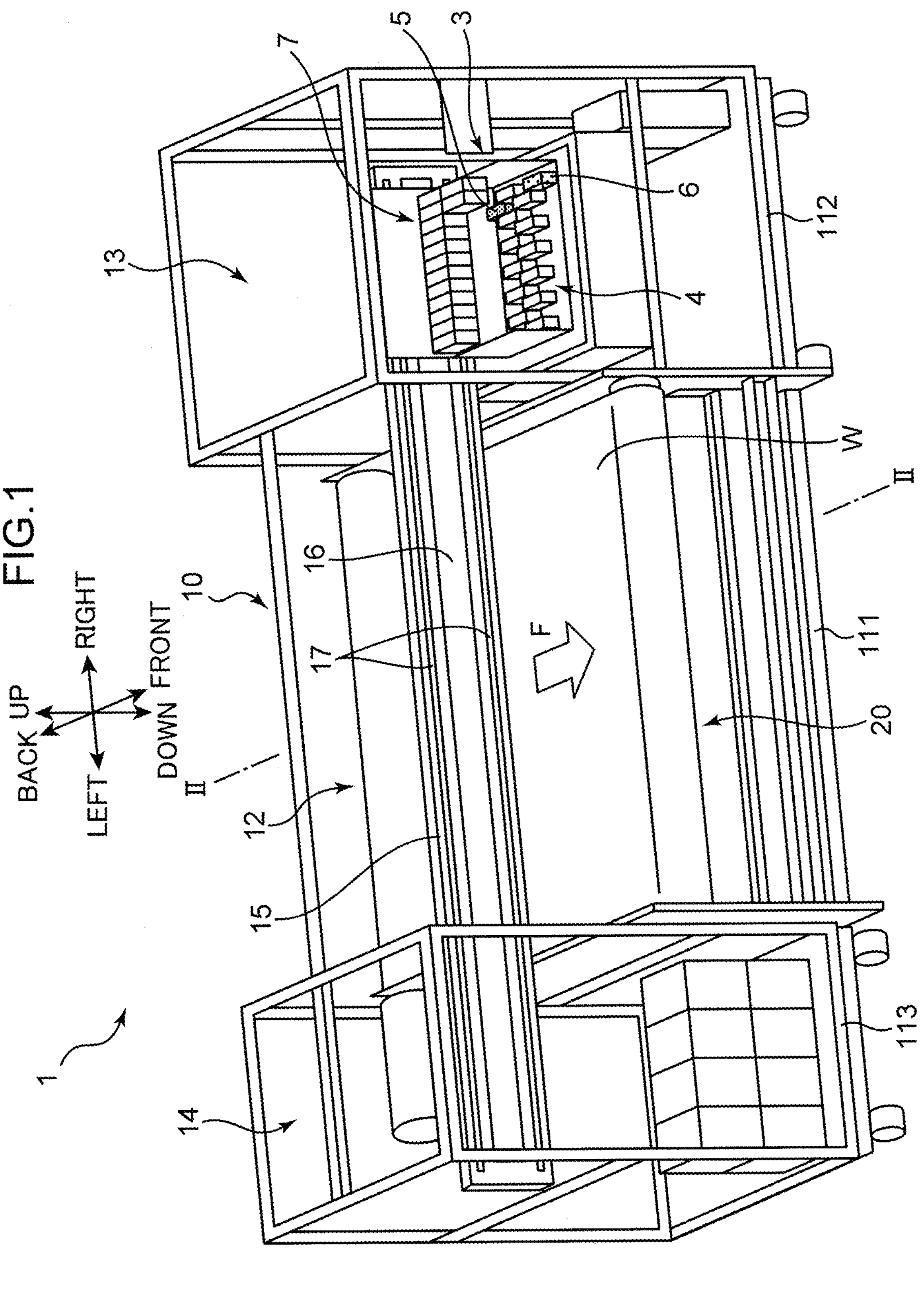
FIG. 1 is a perspective view showing an overall configuration of an inkjet recording device according to a first embodiment of the present disclosure.
Figure 2:
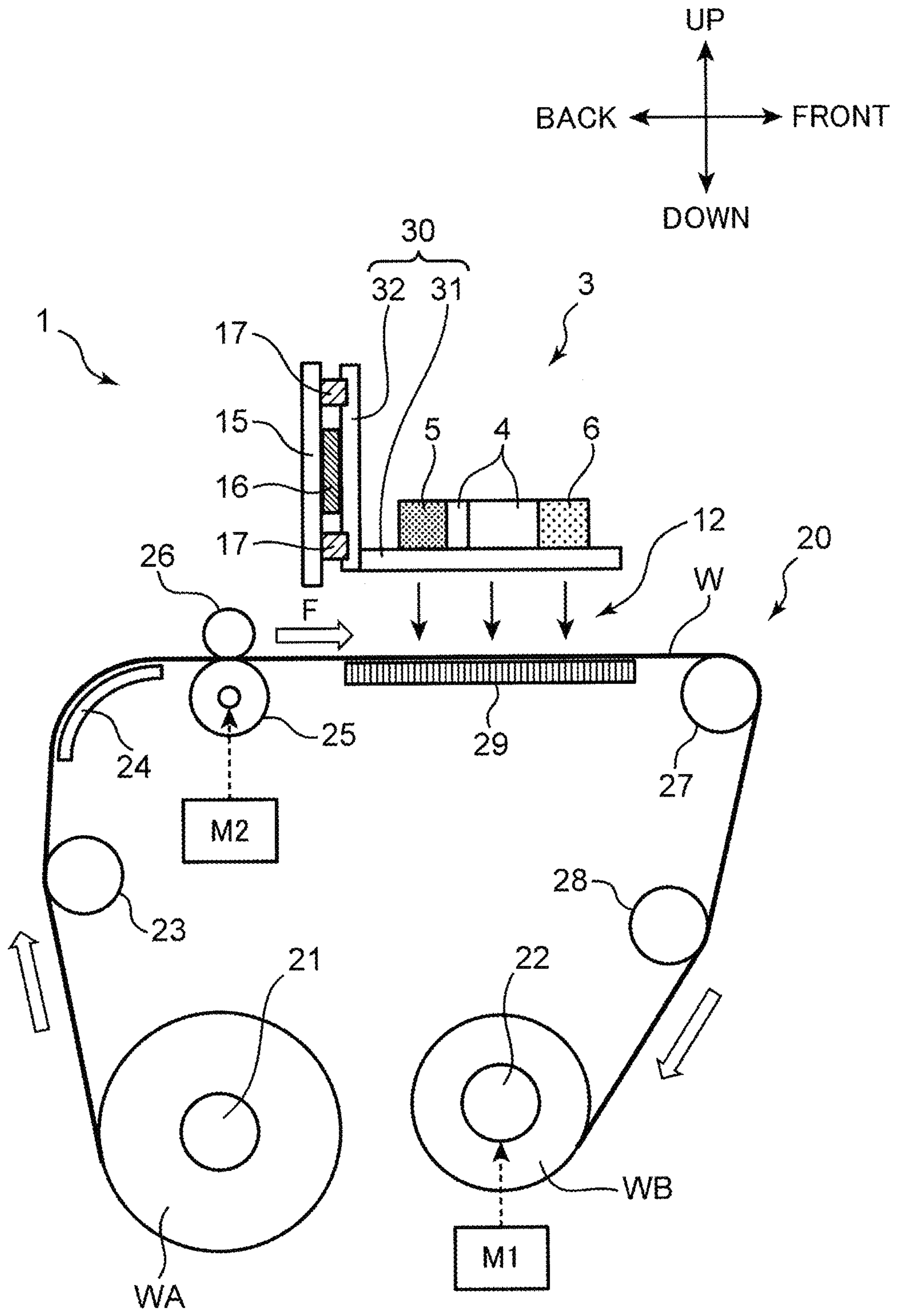
FIG. 2 is a schematic cross-sectional view taken along the line II-II of FIG. 1.

FIG. 1 is a perspective view showing the overall configuration of an inkjet printer 1 according to the first embodiment of the present disclosure, and FIG. 2 is a schematic cross-sectional view taken along the line II-II of FIG. 1. The inkjet printer 1 is a printer that prints an image on a wide, long workpiece W (recording medium) by using the inkjet method, and includes a device frame 10, and a workpiece conveyance unit 20 (conveyance unit) and a carriage 3 incorporated in the device frame 10. Note that in the present embodiment, the right-and-left direction is a main scanning direction S (FIG. 3) when printing on the workpiece W, and the direction from back to front is a sub scanning direction (conveyance direction F of workpiece W).

The device frame 10 forms a framework for mounting various components of the inkjet printer 1. The workpiece conveyance unit 20 is a mechanism that intermittently feeds (conveys) the workpiece W such that the workpiece W progresses in the conveyance direction F from back to front in a printing region where inkjet print processing is executed. The carriage 3 carries ink heads 4, a pre-processing head 5, a post-processing head 6, and sub-tanks 7, and reciprocates in the main scanning direction S (right-and-left direction) that intersects the conveyance direction F of the workpiece W during the inkjet print processing.

The device frame 10 includes a central frame 111, a right frame 112, and a left frame 113. The central frame 111 forms a framework for mounting various components of the inkjet printer 1, and has a right-and-left width according to the workpiece conveyance unit 20. The right frame 112 and the left frame 113 are erected immediately on the right side and left side of the central frame 111, respectively. An area between the right frame 112 and the left frame 113 is a print area 12 where the print processing is executed on the workpiece W.

The right frame 112 forms a maintenance area 13. The maintenance area 13 is an area where the carriage 3 is evacuated when the print processing is not executed. In the maintenance area 13, cleaning treatment, purge treatment, and the like of nozzles (ejection holes) of the ink heads 4, the pre-processing head 5, and the post-processing head 6 are executed, and a cap is fitted. The left frame 113 forms a return area 14 for the carriage 3. The return area 14 is a region where the carriage 3 that executes main scan in the print area 12 from right to left in the print processing temporarily enters when executing main scan in the opposite direction.

A carriage guide 15 is assembled into the upper side of the device frame 10 to allow the carriage 3 to reciprocate in the right-and-left direction. The carriage guide 15 is a plate-like member long in the right-and-left direction and is disposed above the workpiece conveyance unit 20. A timing belt 16 (moving member) is assembled into the carriage guide 15 to allow circling movement in the right-and-left direction (main scanning direction). The timing belt 16 is an endless belt and is driven to allow leftward or rightward circling movement by a carriage drive unit 3S described later.

The carriage guide 15 includes one pair of upper and lower guide rails 17 (holding member) that holds the carriage 3 in the main scanning direction S in a state where reciprocation is possible extending parallel in the right-and-left direction. The carriage 3 is engaged with the guide rails 17. The carriage 3 is fixed to the timing belt 16. With leftward or rightward circling movement of the timing belt 16, the carriage 3 moves leftward or rightward along the carriage guide 15 while being guided by the guide rails 17.

Mainly with reference to FIG. 2, the workpiece conveyance unit 20 includes a delivery roller 21 that delivers the workpiece W before printing, and a take-up roller 22 that takes up the workpiece W after printing. The delivery roller 21 is disposed at the rear lower part of the device frame 10, and is a winding shaft of a delivery roll WA, which is a winding body of the workpiece W before printing. The take-up roller 22 is disposed at the front lower part of the device frame 10, and is a winding shaft of a take-up roll WB, which is a winding body of the workpiece W after print processing. A first motor M1 is attached to the take-up roller 22 to drive the take-up roller 22 to rotate about the shaft to execute the take-up operation of the workpiece W.

The route between the delivery roller 21 and the take-up roller 22 and passing through the print area 12 is the conveyance route for the workpiece W. In this conveyance route, a first tension roller 23, a workpiece guide 24, a conveyance roller 25, a pinch roller 26, a return roller 27, and a second tension roller 28 are disposed in order from the upstream side. The first tension roller 23 applies prescribed tension to the workpiece W upstream of the conveyance roller 25. The workpiece guide 24 changes the conveyance direction of the workpiece W from the upward direction to the forward direction, and conveys the workpiece W to the print area 12.

The conveyance roller 25 is a roller that generates conveyance force that intermittently feeds the workpiece W in the print area 12. The conveyance roller 25 is driven to rotate about a shaft by a second motor M2, and intermittently conveys the workpiece W forward (prescribed conveyance direction F) such that the workpiece W passes through the print area 12 opposite the carriage 3 (image forming position). The pinch roller 26 is disposed to face the conveyance roller 25 from above, and forms a conveyance nip with the conveyance roller 25.

The return roller 27 changes the conveyance direction of the workpiece W that has passed through the print area 12 from forward to downward, and guides the workpiece W after the print processing to the take-up roller 22. The second tension roller 28 applies prescribed tension to the workpiece W downstream of the conveyance roller 25. In the print area 12, a platen 29 is disposed below the conveyance route for the workpiece W.

The carriage 3 reciprocates in the main scanning direction S (right-and-left direction in the present embodiment) that intersects the conveyance direction F (orthogonal in the present embodiment) while being cantilevered by the guide rails 17. The carriage 3 includes: a carriage frame 30; and the ink heads 4, the pre-processing head 5, the post-processing head 6, and the sub-tanks 7 mounted on the carriage frame 30. The carriage frame 30 includes a head support frame 31 and a back frame 32 (engagement unit).

The head support frame 31 is a horizontal plate holding the heads 4 to 6 described above. The back frame 32 is a vertical plate extending upward from the rear edge of the head support frame 31. As described above, the timing belt 16 is fixed to the back frame 32. The guide rails 17 are engaged with the back frame 32. That is, in the present embodiment, the back frame 32 is an engagement unit held by the guide rails 17 in a cantilevered state. The head support frame 31 is a horizontal plate whose rear end side is cantilevered to the guide rails 17 by the engagement unit.

Note that the cantilevered state means that the engagement unit (back frame 32) exists only on one side of the upstream side or downstream side of the center of the carriage 3 in the conveyance direction F, and that another engagement unit does not exist on the opposite side of the engagement unit in the carriage 3. The engagement unit is a portion held by the guide rails 17, which is a holding member. The engagement unit may further be disposed outside the range where the ink heads 4 and the processing heads are arranged in the conveyance direction F. That is, the engagement unit may be disposed only on the upstream side or only on the downstream side of the range in which the ink heads 4 and the processing heads are arranged in the conveyance direction F.

[Details of Carriage]

Figure 3:
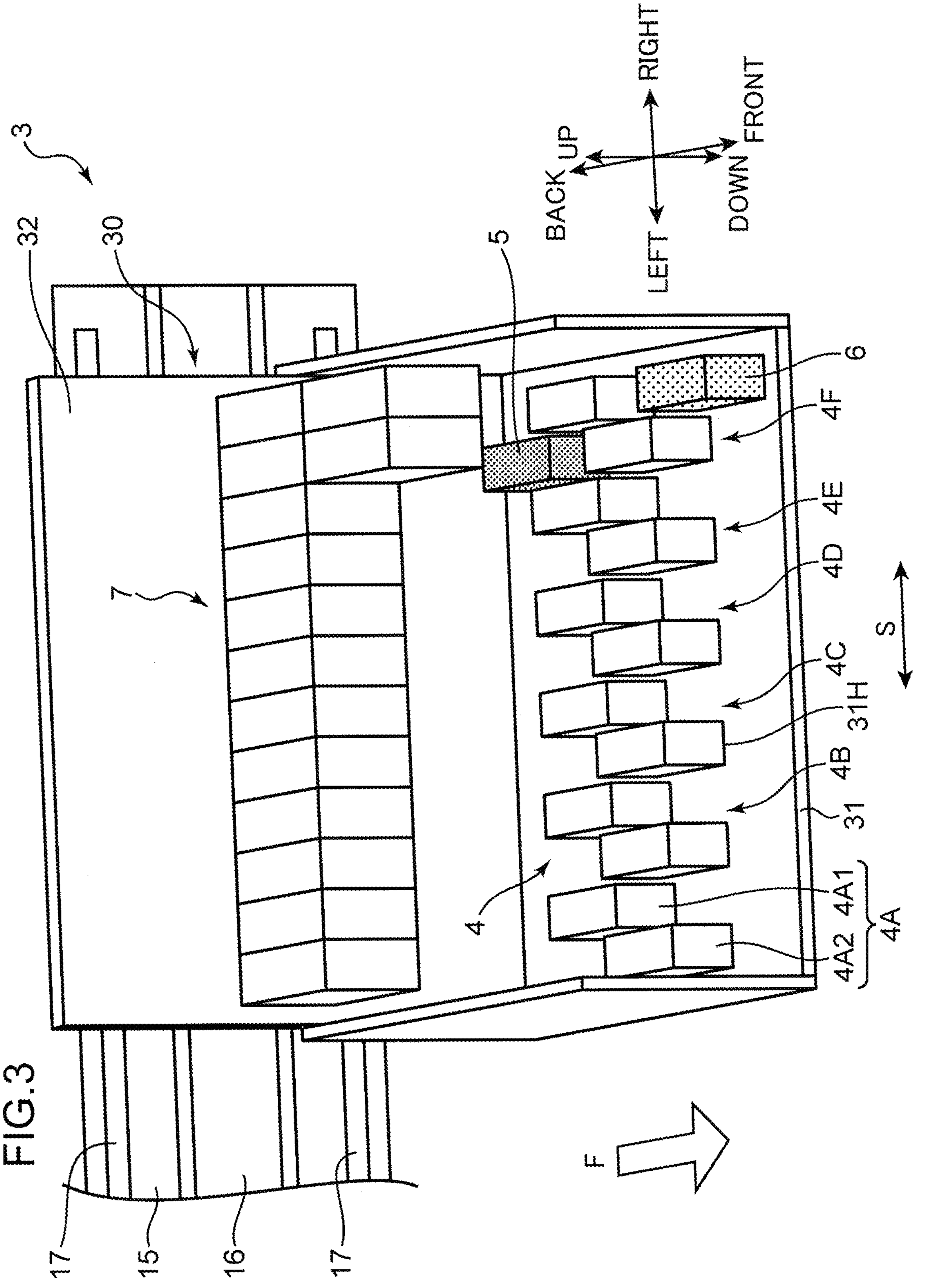
FIG. 3 is an enlarged perspective view of a carriage shown in FIG. 1.

Further description of the carriage 3 will be added. FIG. 3 is an enlarged perspective view of the carriage 3 shown in FIG. 1. FIG. 3 shows the conveyance direction F of the workpiece W (sub scanning direction) and the main scanning direction S, which is a movement direction of the carriage 3. FIG. 3 shows an example in which the plurality of ink heads 4 that ejects the ink for image formation to the workpiece W, the pre-processing head 5 and the post-processing head 6 that eject the non-colored processing solutions, and the plurality of sub-tanks 7 that supplies the ink and the processing solutions to the heads 4 to 6 are located on the carriage 3.

Each of the ink heads 4 includes, for example, a large number of nozzles (ink ejection holes) that eject ink droplets by an ejection method such as the piezo method using a piezo element or the thermal method using a heating element, and an ink passage that guides the ink to the nozzles. As the ink, for example, a water-based pigment ink containing a water-based solvent, a pigment, and a binding resin can be used. The plurality of ink heads 4 in the present embodiment includes first to sixth ink heads 4A to 4F that each eject inks of six colors different from each other. For example, the first ink head 4A ejects an orange ink, the second ink head 4B ejects a green ink, the third ink head 4C ejects a yellow ink, the fourth ink head 4D ejects a red ink, the fifth ink head 4E ejects a blue ink, and the sixth ink head 4F ejects a black ink.

The ink heads 4A to 4F of respective colors are mounted on the head support frame 31 of the carriage 3 so as to align in the main scanning direction S. The ink heads 4A to 4F of respective colors each include two heads. For example, the first ink head 4A includes: an upstream ink head 4A1 arranged upstream in the conveyance direction F; and a downstream ink head 4A2 arranged at a position downstream of the upstream ink head 4A1 and shifted leftward in the main scanning direction S. The ink heads 4B to 4F of other colors are configured similarly. Respective upstream ink heads of the ink heads 4B to 4F align in the main scanning direction S at the same position as the upstream ink head 4A1 in the conveyance direction F. Respective downstream ink heads align in the main scanning direction S at the same position as the downstream ink head 4A2 in the conveyance direction F. Note that in the present embodiment, the ink heads 4 of one row include one ink head 4A, one ink head 4B, one ink head 4C, one ink head 4D, one ink head 4E, and one ink head 4F of respective colors, but there may be two or more same-color ink heads 4 in one row.

Note that in the following description, in the ink heads 4A to 4F of respective colors, two ink heads arranged to align in the conveyance direction may be referred to as same-color ink heads. The ink heads 4A to 4F of respective colors may be referred to as one set of same-color ink heads, and the ink heads 4A to 4F may be collectively referred to as a plurality of sets of same-color ink heads. The plurality of sets of same-color ink heads is arranged to align in the main scanning direction S and ejects inks of colors different from each other.

The pre-processing head 5 and the post-processing head 6 are arranged at positions different from the ink heads 4 in the conveyance direction F. The pre-processing head 5 is arranged upstream of the ink heads 4 in the conveyance direction F. FIG. 3 shows an example in which one pre-processing head 5 is arranged near the right end of an array of the ink heads 4. Similarly, the post-processing head 6 is arranged downstream of the ink heads 4 in the conveyance direction F FIG. 3 shows an example in which one post-processing head 6 is arranged at the right end of the array of the ink heads 4. In another embodiment, a plurality of the pre-processing heads 5 or a plurality of the post-processing heads 6 may be arranged. That is, the carriage 3 includes at least one pre-processing head 5 and at least one post-processing head 6.

Note that as used in the description above, a series of heads along the main scanning direction S including the ink heads 4 and the post-processing head 6 is referred to as a row of heads, or simply a row. A series of heads along the conveyance direction F including the ink heads 4, the pre-processing head 5, and the post-processing head 6 is referred to as a column of heads, or simply a column.

The pre-processing head 5 ejects a pre-processing solution for applying prescribed pre-processing to the workpiece W. The pre-processing solution is ejected from the pre-processing head 5 to a position, from the ink heads 4, of the workpiece W where the ink has not yet been ejected from the ink heads 4. The pre-processing solution is a processing solution that does not produce color even if the solution adheres to the workpiece W, and is, for example, a processing solution that exhibits functions such as enhancing fixability of the ink to the workpiece W and cohesiveness of ink pigments. As such a pre-processing solution, a processing solution in which a binding resin is blended in a solvent, or a processing solution in which a positively charged cationic resin is blended in a solvent can be used.

The post-processing head 6 ejects a post-processing solution for applying prescribed post-processing to the workpiece W to which the ink has adhered. The post-processing solution is ejected from the post-processing head 6 at a position of the workpiece W after the ink is ejected from the ink heads 4. The post-processing solution is a processing solution that does not produce color even if the solution adheres to the workpiece W similarly, and is a processing solution that exhibits the function of enhancing fixability and fastness (resistant to rubbing and scraping) of an ink image printed on the workpiece W by the ink heads 4. As such a post-processing solution, a silicone-based processing solution or the like can be used. Note that the post-processing solution and the pre-processing solution are different processing solutions. Specifically, components included in the post-processing solution and the pre-processing solution are different.

Here, the processing solution that does not produce color indicates that when printed independently on the recording medium, color development is not recognized with the human naked eye. The color mentioned here includes colors with saturation of 0, such as black, white, and gray. The processing solution that does not produce color is basically a transparent solution, but for example, one-liter processing solution is not completely transparent when viewed in a liquid form, but may appear slightly white or other colors. Such a color is so faint that color development cannot be recognized with the human naked eye when printed independently on the recording medium. Note that depending on the type of the processing solution, when printed on the recording medium independently, a change such as gloss may occur on the recording medium, but such a state is not color development.

In the present embodiment, the pre-processing solution and the post-processing solution may be ejected substantially all over the workpiece W, or the pre-processing solution and the post-processing solution may be selectively ejected in accordance with the image to be printed, as with the ink.

Subsequently, a case of selectively ejecting the pre-processing solution and the post-processing solution will be described. As described above, the pre-processing solution, the ink, and the post-processing solution are ejected in this order on the workpiece W where colors are printed in accordance with the image. In this case, the ink may be of one color or of a plurality of colors. Basically, the pre-processing solution and the post-processing solution are not ejected to areas where no color is printed, that is, areas where the ink is not ejected. Note that to adjust the quality of the image to be printed and the texture of the workpiece W, part of ejection selection of the pre-processing solution and the post-processing solution may be different from ink ejection.

Openings 31H (FIG. 3) are provided at head arrangement places of the head support frame 31. The ink heads 4A to 4F, the pre-processing head 5, and the post-processing head 6 are assembled to the head support frame 31 to fit into respective openings 31H. The nozzles arranged on the lower end surface of each of the heads 4, 5, and 6 are exposed from each opening 31H.

The sub-tanks 7 are supported by the carriage 3 above the heads 4, 5, and 6 via a holding frame (not shown). The sub-tanks 7 are provided corresponding to respective heads 4, 5, and 6. Respective sub-tanks 7 are supplied with the ink or processing solution from a cartridge or main tank (not shown) containing the ink and processing solution. Respective sub-tanks 7 supply the ink or processing solution to the heads 4, 5, and 6. Respective sub-tanks 7 and the heads 4, 5, and 6 are connected by pipelines (P1, P2, and P3 shown in FIG. 17) not shown in FIG. 3.

As described above, the inkjet printer 1 according to the present embodiment is an all-in-one printer in which three types of heads including the ink heads 4, the pre-processing head 5, and the post-processing head 6 are mounted on one carriage 3. With the inkjet printer 1, for example, in the textile printing process of executing inkjet printing on fabric in digital textile printing, the ejection process of the pre-processing solution and the ejection process of the post-processing solution can be executed integrally. Therefore, the textile printing process can be simplified and the textile printing device can be made compact.

[Printing Method]

Figure 4:
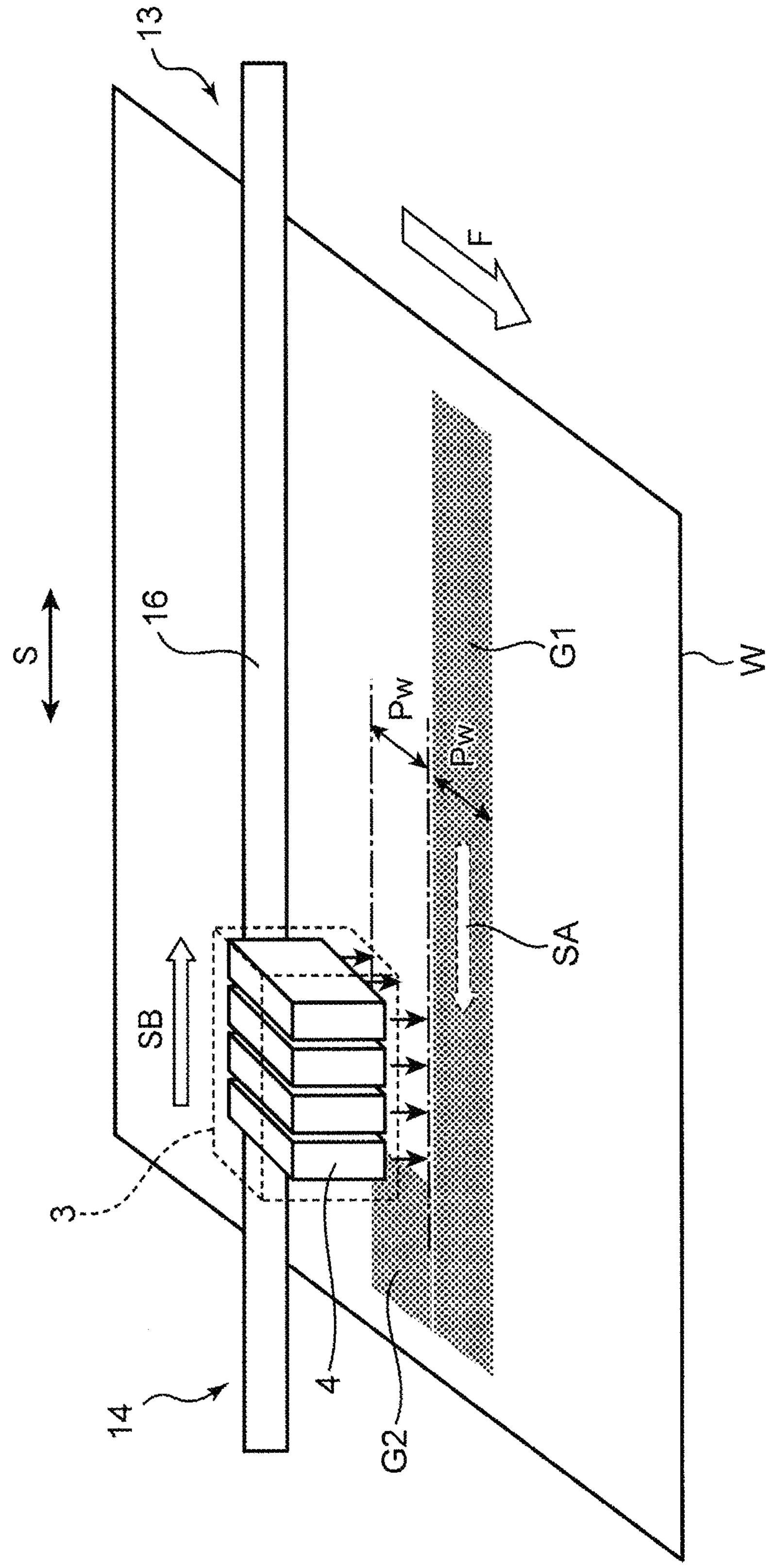
FIG. 4 is a schematic diagram showing a serial printing method adopted in the first embodiment of the present disclosure.

Subsequently, the printing method executed by the inkjet printer 1 according to the present embodiment will be described. The inkjet printer 1 executes the print processing on the workpiece W by the serial printing method. FIG. 4 is a schematic diagram showing the serial printing method. FIG. 4 simply depicts the carriage 3 by omitting the pre-processing head 5 and the post-processing head 6.

When the workpiece W has a wide size, it is not possible to print while continuously feeding the workpiece W. The serial printing method is a printing method repeating reciprocation of the carriage 3 on which the ink heads 4 of respective colors are mounted in the main scanning direction S and intermittent feeding of the workpiece W in the conveyance direction F. Here, it is assumed that the ink heads 4 have a prescribed printing width Pw in the conveyance direction F. The printing width Pw is approximately equal to the length of the arrangement region of the ink ejection nozzles of the ink heads 4 in the conveyance direction F. Note that in FIG. 4 and FIGS. 5A and 5B described below, the length of each head in the conveyance direction F and the printing width Pw are drawn to be approximately the same. Actually, the length of each head in the conveyance direction F is longer than the printing width Pw and the length of the arrangement region of the ejection nozzles in the conveyance direction F.

FIG. 4 shows the state where the carriage 3 has moved in the forward path direction SA in the main scanning direction S and printing of a belt-shaped image G1 with the printing width Pw has been completed. During the main scan in the forward path direction SA, feeding of the workpiece W is stopped. After printing the belt-shaped image G1, the workpiece W is sent in the conveyance direction F by a pitch corresponding to the printing width Pw. At this time, the carriage 3 waits in the return area 14 on the left end side. After sending the workpiece W, the carriage 3 turns back in the return path direction SB as the timing belt 16 reverses the movement. The workpiece W is in a stopped state. Then, as shown in FIG. 4, while moving in the return path direction SB, the carriage 3 prints a belt-shaped image G2 with the printing width Pw on the upstream side of the belt-shaped image G1. Similar operations are repeated thereafter.

Figure 5A:
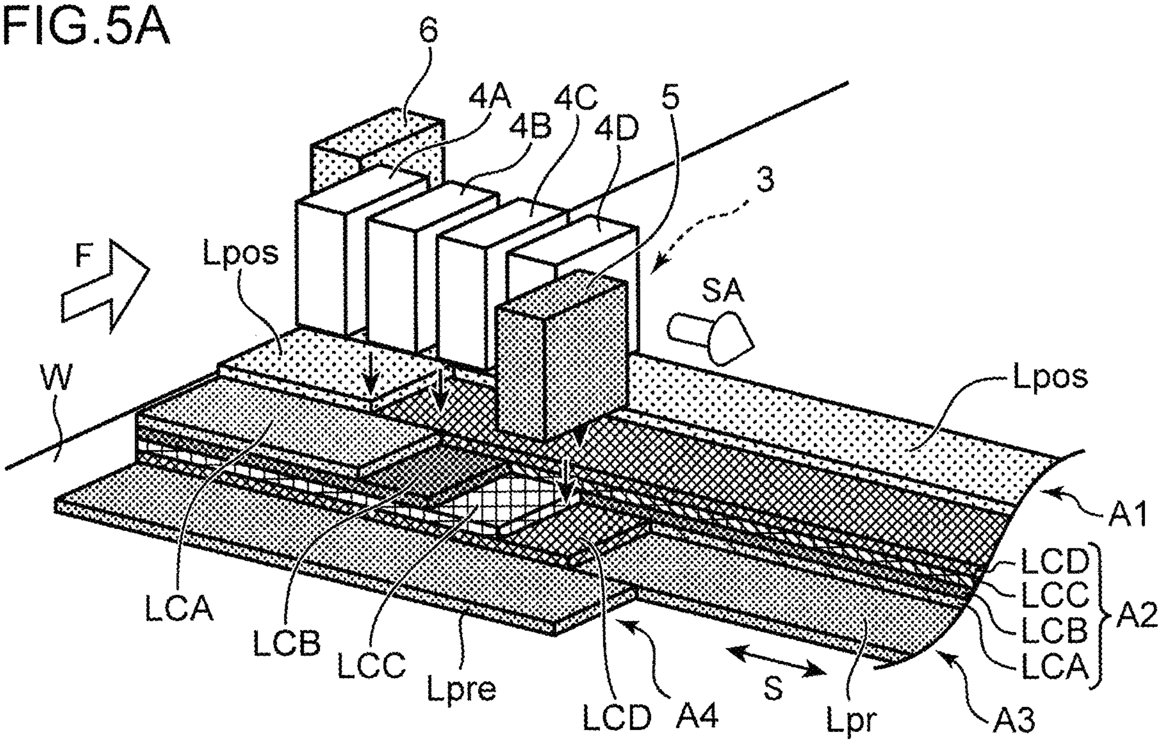
FIG. 5A is a schematic diagram showing a printing situation in a forward path and return path of the carriage.
Figure 5B:
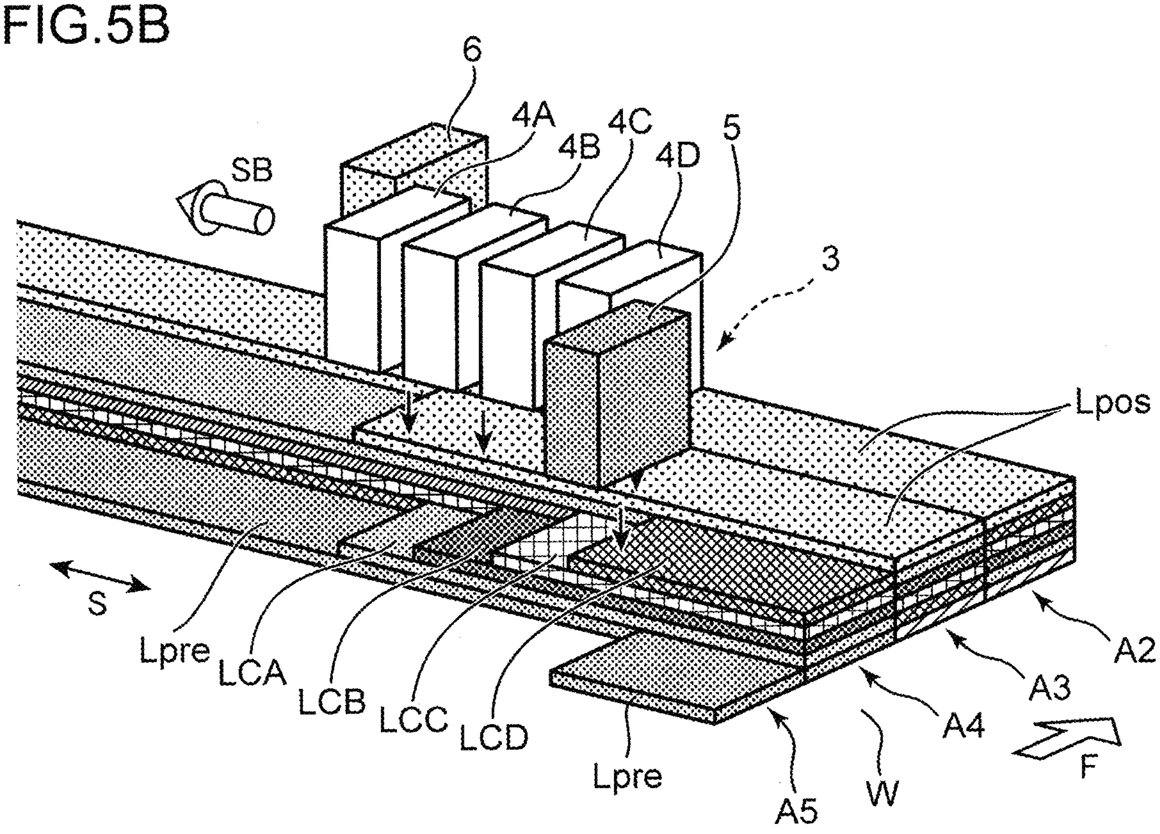
FIG. 5B is a schematic diagram showing the printing situation in the forward path and return path of the carriage.

FIGS. 5A and 5B are each a schematic diagram showing the printing situation in the forward path and return path of the carriage 3. Here, the ink heads 4, the pre-processing head 5, and the post-processing head 6 mounted on the carriage 3 are simply shown. The ink heads 4 include the first, second, third, and fourth ink heads 4A, 4B, 4C, and 4D for ejecting the inks of first, second, third, and fourth colors different from each other, respectively, and these first to fourth ink heads 4A to 4D align in the main scanning direction S. The pre-processing head 5 is arranged on the upstream side of the ink heads 4 in the conveyance direction F, and the post-processing head 6 is arranged on the downstream side. As in the case described in FIG. 4, the workpiece W is sent in the conveyance direction F between the forward path printing and the return path printing. The moving distance in the conveyance direction F at this time is the interval pitch (head pitch) between adjacent heads in the conveyance direction F. This moving distance is also the printing width Pw of each of the heads 4, 5, and 6.

FIG. 5A shows the state where the carriage 3 is executing the printing operation while moving in the forward path direction SA in the main scanning direction S (forward path main scan). A region A4 on the workpiece W is the region facing the pre-processing head 5 mounted on the most upstream side of the carriage 3. In the forward path main scan at this time, a pre-processing layer Lpre is formed on the region A4 by the pre-processing solution ejected from the pre-processing head 5.

A region A3 is a region on the downstream side of the region A4 by one head pitch, and is a region facing the ink heads 4. On the region A3, the pre-processing layer Lpre has already been formed over the entire length of the main scanning direction by the previous return path main scan. In the forward path main scan at this time, on the pre-processing layer Lpre of the region A3, first, second, third, and fourth ink layers LCA, LCB, LCC, and LCD are formed with the inks of the first to fourth colors sequentially ejected in the alignment order of the first to fourth ink heads 4A to 4D. Note that FIG. 5A shows that the fourth to first ink layers LCD to LCA are sequentially stacked for easy understanding, but are not stacked in reality. Note that the pre-processing layer Lpre described above and a post-processing layer Lpos described later are also not formed on the workpiece W.

A region A2 is a region on the downstream side of the region A3 by one head pitch, and is a region facing the post-processing head 6 mounted on the most downstream side of the carriage 3. On the region A2, the pre-processing layer Lpre by the previous forward path main scan and the first to fourth ink layers LCA to LCD by the previous return path main scan have already been formed over the entire length of the main scanning direction. In the forward path main scan at this time, the post-processing layer Lpos is formed on the first to fourth ink layers LCA to LCD of the region A2 by the post-processing solution ejected from the post-processing head 6.

A region A1 is a region on the downstream side of the region A2 by one head pitch, and is a region through which the carriage 3 has passed and in which the print processing is completed. That is, in the region A1, the pre-processing layer Lpre, the first to fourth ink layers LCA to LCD, and the post-processing layer Lpos are formed over the entire length of the main scanning direction.

FIG. 5B shows a state in which, after finishing the forward path main scan of FIG. 5A, the carriage 3 turns back and executes the return path main scan while moving in the return path direction SB. Before the turn-back movement, the workpiece W is sent in the conveyance direction F by one head pitch. A region A5 on the workpiece W is a region on the upstream side of the region A4 by one head pitch, and is a region facing the pre-processing head 5 in the return path main scan at this time. The pre-processing layer Lpre is formed on the region A5 with the pre-processing solution ejected from the pre-processing head 5.

The first to fourth ink layers LCA to LCD and the post-processing layer Lpos are formed on the existing layer in each of the region A4 and the region A3. Specifically, in the region A4, the first to fourth ink layers LCA to LCD are formed on the pre-processing layer Lpre. In the region A3, the post-processing layer Lpos is formed on the first to fourth ink layers LCA to LCD. The region A2 is a region with the print processing completed, following the region A1.

The print processing is possible in both the forward path main scan and the return path main scan as described above because the pre-processing head 5 and the post-processing head 6 are shifted in the conveyance direction F with respect to the ink heads 4. If the pre-processing head 5, the ink heads 4, and the post-processing head 6 align in this order in the main scanning direction S on the carriage 3, the print processing that can eject the pre-processing solution and the post-processing solution in the desired landing order can be implemented in only one of the forward path and the return path main scan. To enable bi-directional print processing, a pair of the pre-processing head 5 and the post-processing head 6 needs to be arranged on both sides of the array of the ink heads 4. In this case, the length of the carriage 3 in the main scanning direction S increases. Since such arrangement is unnecessary in the present embodiment, the length of the carriage 3 in the main scanning direction S can be reduced.

Note that the plurality of rows of ink heads 4 can increase the amount of ink that lands on the workpiece W. For example, if there are two rows of the ink heads 4, printing can be executed in the following manner. After the first to fourth ink layers LCA to LCD are formed as described above by the ink heads 4 of the first row, the workpiece W is conveyed by one head pitch in the conveyance direction F, and the first to fourth ink layers LCA to LCD are formed by the ink heads 4 of the second row. In this way, two layers of ink can be printed on the workpiece W.

Figure 6:
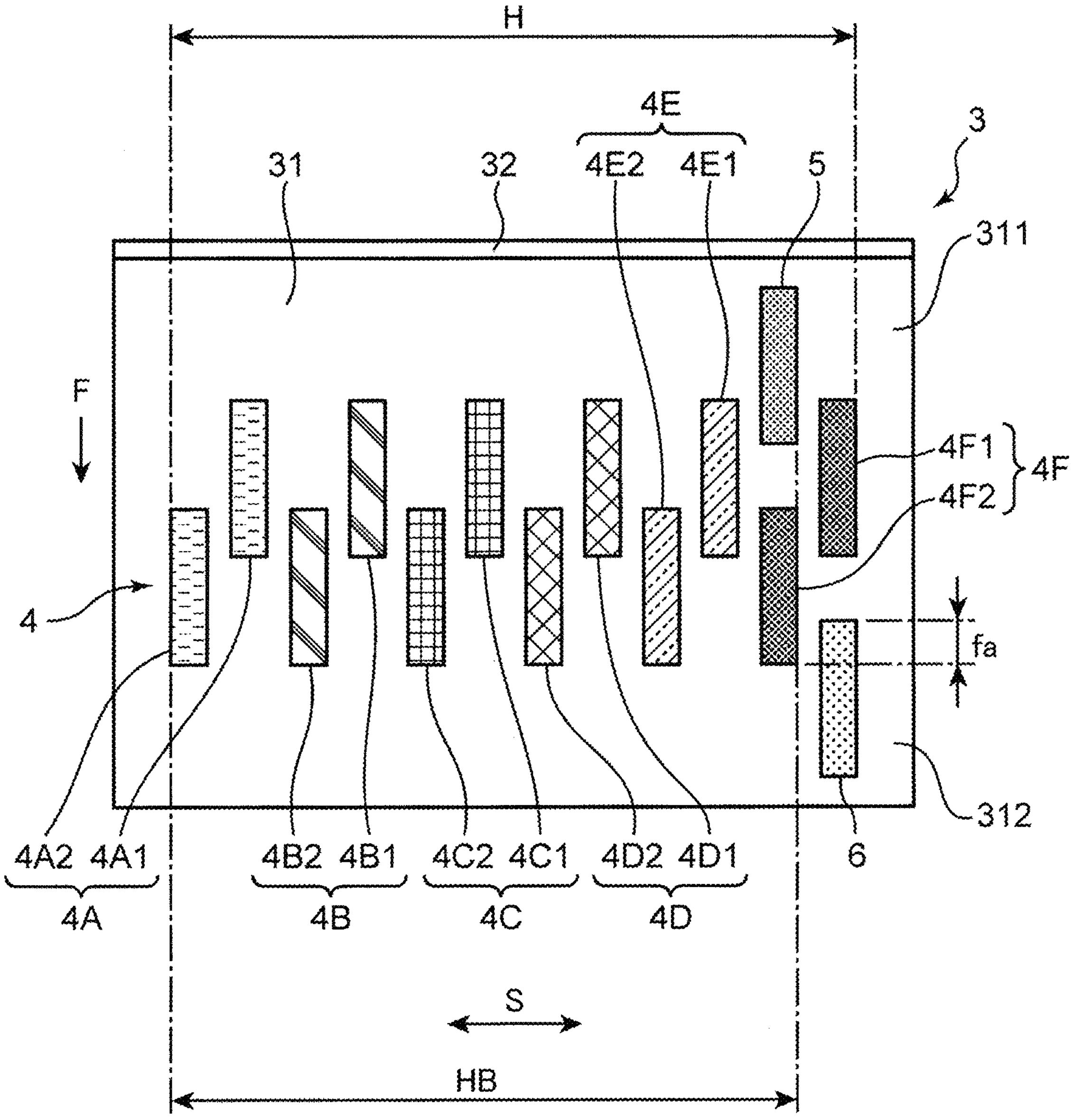
FIG. 6 is the plan view schematically showing arrangement of ink heads and processing heads on the carriage shown in FIG. 3.

FIG. 6 is a plan view schematically showing the head arrangement on the carriage 3 according to the present embodiment, and is also a diagram showing the arrangement of the ink heads 4, the pre-processing head 5, and the post-processing head 6 (plurality of processing heads) on the carriage 3 shown in FIG. 3. As described above, the carriage 3 is held in a cantilevered state by the guide rails 17 in the back frame 32 (engagement unit). The back frame 32 is disposed on the upstream side of the head support frame 31 in the conveyance direction F. In the conveyance direction F, the side of the head support frame 31 where the back frame 32 is disposed is a proximal side 311, and the side of the head support frame 31 opposite the proximal side 311 is a distal side 312. As described above, on the head support frame 31 of the carriage 3, the first to sixth ink heads 4A to 4F ejecting inks of six colors different from each other, the pre-processing head 5, and the post-processing head 6 are mounted. The ink heads 4A to 4F of respective colors each include two unit heads (total 12). One pre-processing head 5 and one post-processing head 6 are provided.

A group of the first to sixth ink heads 4A to 4F that constitute the ink heads 4 is arranged to align in the main scanning direction S in the central region of the head support frame 31 in the conveyance direction F. The pre-processing head 5 is arranged on the upstream side of the ink heads 4 in the conveyance direction F and on the proximal side 311 of the head support frame 31 near the right end of the carriage 3 in the main scanning direction S. Meanwhile, the post-processing head 6 is arranged on the downstream side of the ink heads 4 in the conveyance direction F and on the distal side 312 of the head support frame 31 at the right end of the carriage 3 in the main scanning direction S.

The first ink heads 4A include the upstream ink head 4A1 and the downstream ink head 4A2 arranged on the downstream side of the upstream ink head 4A1. That is, the upstream ink head 4A1 and the downstream ink head 4A2 are arranged in the conveyance direction F. The arrangement position of the upstream ink head 4A1 is a position closer to the proximal side 311 in the central region of the head support frame 31. The arrangement position of the downstream ink head 4A2 is a position closer to the distal side 312 in the central region of the head support frame 31. With respect to the upstream ink head 4A1, the downstream ink head 4A2 is arranged at a position shifted to one side (left side) in the main scanning direction S (different position) and at which the ink heads partially overlap in the conveyance direction F. That is, in the present embodiment, the plurality of same-color ink heads is arranged at positions different from each other in the main scanning direction S at which the ink heads partially overlap each other in the conveyance direction F. If three or more same-color ink heads are arranged in the conveyance direction F, two same-color ink heads arranged adjacently in the conveyance direction F are arranged as described above. Of course, the upstream ink head 4A1 and the downstream ink head 4A2 may be arranged at the same position in the main scanning direction S (position aligned linearly in the conveyance direction F). However, the arrangement of the present embodiment can reduce the size of the carriage 3 in the conveyance direction F.

With such arrangement, the ink heads 4 that eject one color are collectively arranged in the main scanning direction S. Specifically, all the ink heads 4 mounted on the carriage 3 to eject one color are arranged so as not to sandwich, between the ink heads in the main scanning direction S, the ink heads 4 that eject another color. Furthermore, all the ink heads 4 mounted on the carriage 3 to eject one color may be arranged within a prescribed range, and the ink heads 4 that eject another color may not be arranged within the range.

If there is a difference in the printing state, such as the landing position or the ejection amount, between the two ink heads 4, the difference is likely to be more noticeable when the two ink heads 4 eject the same color than when ejecting different colors. If the ink heads 4 that eject the same color are arranged together in the main scanning direction S, even if there is a difference in the printing state between the ink heads 4, it is possible to make it difficult for the image quality of printing to decrease.

The second to sixth ink heads 4B to 4F also include the upstream ink heads 4B1, 4C1, 4D1, 4E1, and 4F1 and the downstream ink heads 4B2, 4C2, 4D2, 4E2, and 4F2, in a similar manner to the upstream ink head 4A1 and the downstream ink head 4A2 described above. The upstream ink heads 4A1 to 4F1 of the first to sixth ink heads 4A to 4F respectively align at the same position in the conveyance direction F with prescribed intervals in the main scanning direction S. The downstream ink heads 4A2 to 4F2 also align at the same position in the conveyance direction F with prescribed intervals in the main scanning direction S. As a result, a staggered arrangement pattern is formed in which part of each of the downstream ink heads 4A2 to 4F2 enters between the arrangement pitch of the upstream ink heads 4A1 to 4F1, respectively.

The pre-processing head 5 is arranged such that part of the pre-processing head enters between one pair of ink heads adjacent in the main scanning direction S. Specifically, this is a positional relationship in which the downstream part of the pre-processing head 5 enters between the upstream ink head 4E1 of the fifth ink heads 4E and the upstream ink head 4F1 of the sixth ink heads 4F. The pre-processing head 5 is arranged at the same position as the downstream ink head 4F2 of the sixth ink heads 4F in the main scanning direction S.

The post-processing head 6 is arranged such that the upstream part enters the right part of the downstream ink head 4F2 of the sixth ink heads 4F, and is arranged at the same position as the upstream ink head 4F1 in the main scanning direction S. With such arrangement, the post-processing head 6 has an arrangement relationship with an overlapping region fa with the downstream ink head 4F2 in the conveyance direction F. In the conveyance direction F, the width of each head is greater than the printing width Pw and the width of the arrangement region of the ejection nozzles. Therefore, each head is arranged to have the overlapping region fa such that there is no gap between the printing range Pw of the head of each row and the printing range Pw of the head of the adjacent row.

Note that unless otherwise stated, in each figure including FIG. 6, the spacing between adjacent heads in the main scanning direction S (spacing between centers of respective heads) is the same. Similarly, the spacing between adjacent heads in the conveyance direction F (spacing between centers of respective heads) is the same.

As a result of the head arrangement described above, the pre-processing head 5 and the post-processing head 6 are arranged within the range of the arrangement width H of the ink heads 4 in the main scanning direction S. The ink heads 4 have the arrangement width H between the downstream ink head 4A2 of the first ink heads 4A and the upstream ink head 4F1 of the sixth ink heads 4F in the main scanning direction S. The pre-processing head 5 is arranged within the arrangement width H on the upstream side of the ink heads 4, and the post-processing head 6 is arranged within the arrangement width H on the downstream side of the ink heads 4.

Figure 7:
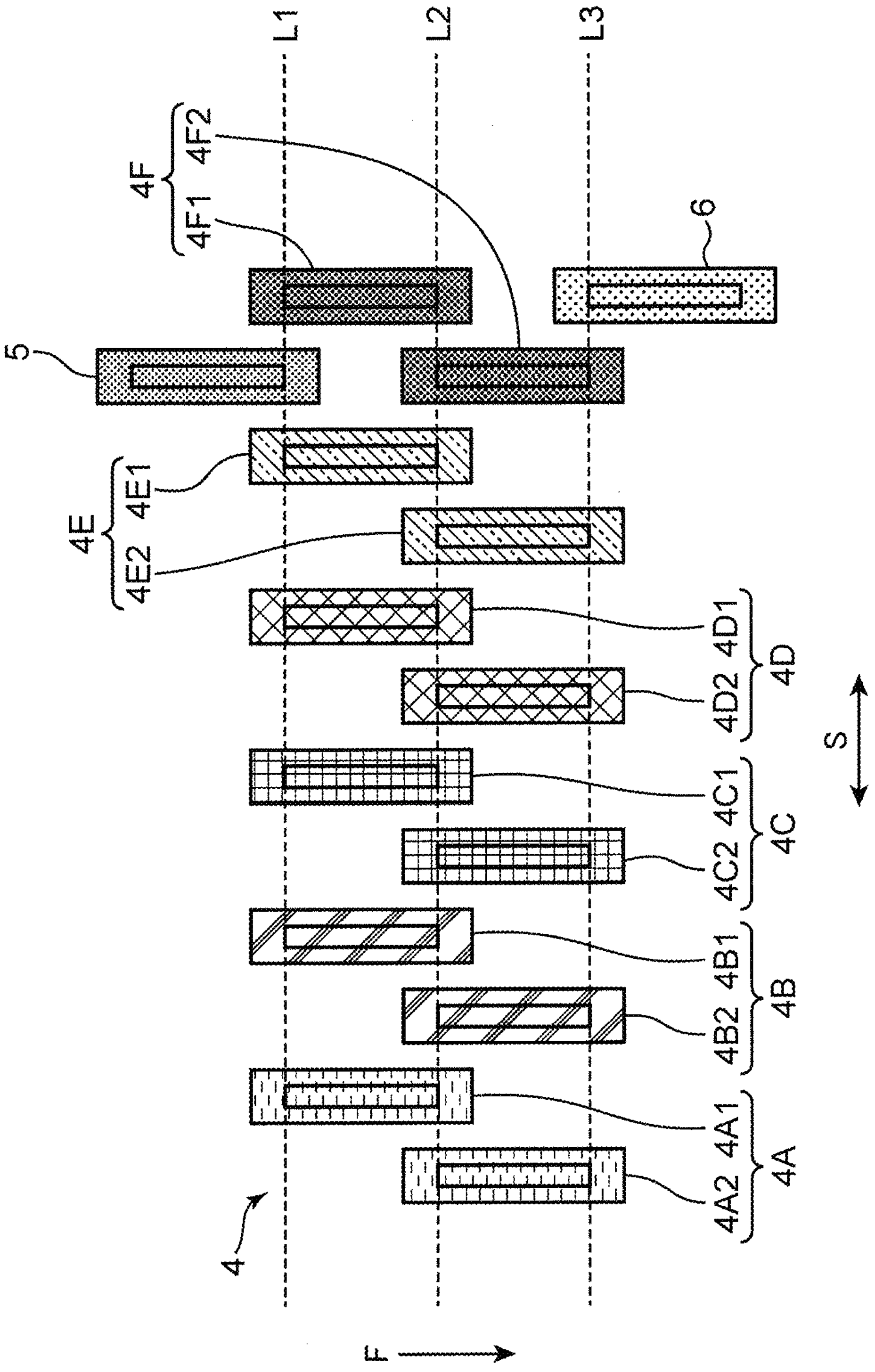
FIG. 7 is a plan view schematically showing a positional relationship of nozzles of the ink heads and the processing heads shown in FIG. 6.

FIG. 7 is a plan view schematically showing the positional relationship of the nozzles of the ink heads and the processing heads shown in FIG. 6. FIG. 7 schematically illustrates the arrangement region of the nozzles that are arranged on the lower surface of each head inside the external shape of the head to eject liquid during printing. The downstream ink heads (4A2 to 4F2) of the first ink heads 4A to the sixth ink heads 4F are arranged at positions closest to the post-processing head 6 in the conveyance direction F among the ink heads of respective colors. Meanwhile, the upstream ink heads (4A1 to 4F1) of the first ink heads 4A to the sixth ink heads 4F are arranged between the pre-processing head 5 and the downstream ink heads (4A2 to 4F2) in the conveyance direction F.

Upstream and downstream ends of the nozzle arrangement regions of the upstream ink heads (4A1 to 4F1) of the first ink heads 4A to the sixth ink heads 4F in the conveyance direction F are arranged at the same position as each other in the conveyance direction F. Similarly, upstream and downstream ends of the nozzle arrangement regions of the downstream ink heads (4A2 to 4F2) of the first ink heads 4A to the sixth ink heads 4F in the conveyance direction F are arranged at the same position as each other in the conveyance direction F. The upstream ends of the nozzle arrangement regions of the upstream ink heads (4A1 to 4F1) in the conveyance direction F are arranged continuously in the conveyance direction F with respect to the downstream end of the nozzle arrangement region of the pre-processing head 5 in the conveyance direction F (adjoining, adjacent). The upstream ends of the nozzle arrangement regions of the downstream ink heads (4A2 to 4F2) in the conveyance direction F are arranged continuously in the conveyance direction F with respect to the downstream ends of the nozzle arrangement regions of the upstream ink heads (4A1 to 4F1) in the conveyance direction F. Furthermore, the upstream end of the nozzle arrangement region of the post-processing head 6 in the conveyance direction F is arranged continuously in the conveyance direction F with respect to the downstream ends of the nozzle arrangement regions of the downstream ink heads (4A2 to 4F2) in the conveyance direction F.

In this way, the arrangement regions of the nozzles ejecting the ink and respective processing solutions are arranged such that the ink and respective processing solutions land adjacent to each other in units of resolution. Therefore, the landing region of the pre-processing solution and the ink landing regions of the upstream ink heads (4A1 to 4F1) are continuous (adjacent) at a pre-processing/ink head boundary line L1, the ink landing regions of the upstream ink heads (4A1 to 4F1) and the ink landing regions of the downstream ink heads (4A2 to 4F2) are continuous at an ink head boundary line L2, and the ink landing regions of the downstream ink heads (4A2 to 4F2) and the landing region of the post-processing solution are continuous at an ink/post-processing head boundary line L3. Note that the same applies to each embodiment thereafter.

Figure 8:
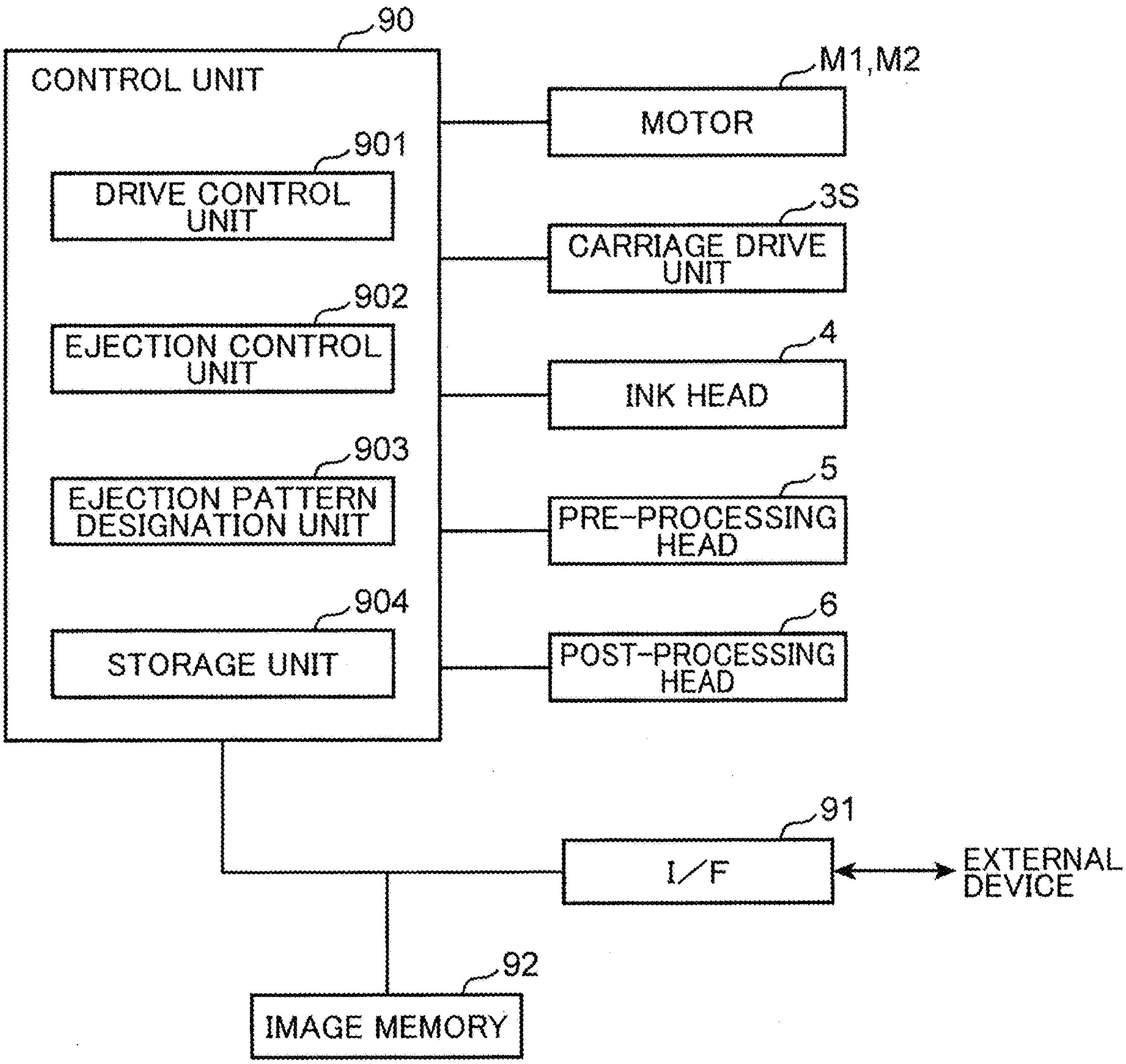
FIG. 8 is a block diagram of the inkjet recording device according to the first embodiment of the present disclosure.

FIG. 8 is a block diagram of the inkjet printer 1 according to the present embodiment. The inkjet printer 1 further includes a control unit 90 that comprehensively controls the operation of each unit of the inkjet printer 1, a carriage drive unit 3S, an I/F 91, and an image memory 92. The control unit 90 includes a central processing unit (CPU), a read only memory (ROM) that stores a control program, a random access memory (RAM) used as a work area for the CPU, and the like. In addition, the carriage drive unit 3S, the IF 91, the image memory 92, and the like are electrically connected to the control unit 90, in addition to the first motor M1 and second motor M2, the ink heads 4, the pre-processing head 5, and the post-processing head 6 described above. The carriage drive unit 3S includes a motor (not shown) that causes the timing belt 16 to go around to cause the carriage 3 to reciprocate along the main scanning direction S.

The image memory 92 temporarily stores, for example, print image data supplied from an external device such as a personal computer.

The I/F 91 is an interface circuit for implementing data communication with an external device, for example, creates a communication signal according to the communication protocol of the network that connects the inkjet printer 1 to the external device, and converts the communication signal from the network side into data in a format that can be processed by the inkjet printer 1. A print instruction signal transmitted from the personal computer or the like is given to the control unit 90 via the IF 91, and the image data is stored in the image memory 92 via the I/F 91.

The control unit 90 functions to include a drive control unit 901, an ejection control unit 902, an ejection pattern designation unit 903 (ejection head designation unit), and a storage unit 904 by the CPU executing the control program stored in the ROM.

The drive control unit 901 controls the conveyance operation of the workpiece W by controlling the first motor M1 and the second motor M2 of the workpiece conveyance unit 20. The drive control unit 901 controls the reciprocation of the carriage 3 along the main scanning direction S by controlling the carriage drive unit 3S.

The ejection control unit 902 inputs a prescribed command signal to the ink heads 4, the pre-processing head 5, and the post-processing head 6, and controls ejection timing of the inks of respective colors, the pre-processing solution, and the post-processing solution.

The ejection pattern designation unit 903 designates the heads 4, 5, and 6 that execute ejection according to image information received from the I/F 91 or the image memory 92. In more detail, when there is a plurality of proportions (ejection patterns) of the ejection amount of respective liquids from the heads 4, 5, and 6 that can record an image according to the image information (for example, the plurality of proportions is stored in the storage unit 904), the ejection pattern to be used for recording is designated from among the ejection patterns. Specifically, when there is a plurality of heads 4, 5, and 6 that eject the same liquid, the ejection pattern is information about how much liquid is to be ejected from which head 4, 5, or 6. The information on the ejection pattern is referred to as ejection pattern information.

Figure 9:
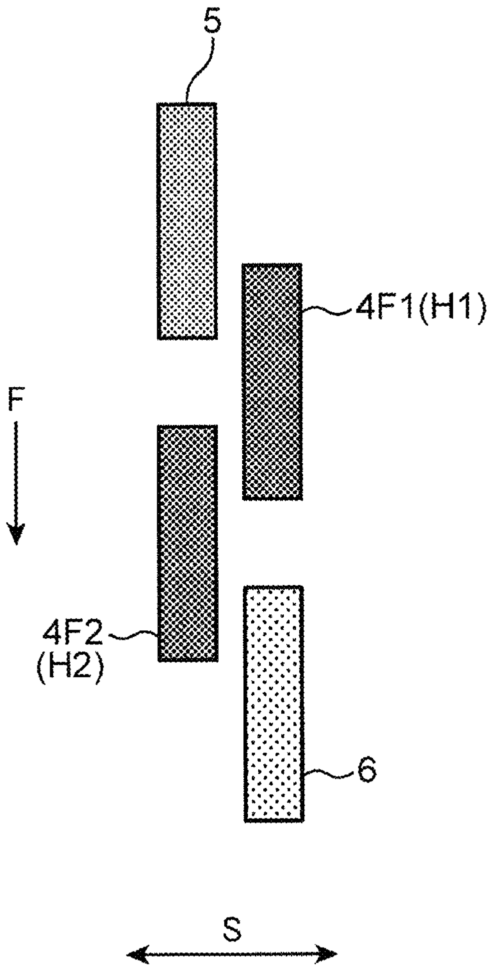
FIG. 9 is a schematic plan view showing the upstream ink heads and the downstream ink heads in the inkjet recording device according to the first embodiment of the present disclosure.

Subsequently, the case where the ejection pattern designation unit 903 designates the ink ejection pattern will be described. To cause the ink to land at a prescribed position on the workpiece W, an ejection ink head, which is an ink head that ejects the ink, is designated from among the plurality of same-color ink heads. In more detail, the ejection pattern designation unit 903 designates the proportion of the ejection amount in the upstream ink heads (4A1 to 4F1) and the downstream ink heads (4A2 to 4F2) out of the ink heads 4 of respective colors (ejection pattern), and inputs a signal corresponding to the proportion to the ejection control unit 902. FIG. 9 is a schematic plan view showing the upstream ink heads (4A1 to 4F1) and the downstream ink heads (4A2 to 4F2) in the inkjet printer 1 according to the present embodiment. FIG. 9 is an enlarged plan view of an area around the upstream ink head 4F1 and the downstream ink head 4F2 of the sixth ink heads 4F that eject black ink out of the ink heads 4 that can eject the inks of a plurality of colors. In the following description, as shown in FIG. 9, the upstream ink head may be referred to as H1, and the downstream ink head as H2, regardless of the ink color.

Note that to add a description of the upstream ink head H1 and the downstream ink head H2, when viewed along the main scanning direction S, the upstream ink head H1 is an ink head whose nozzle arrangement region is not connected to and does not overlap the nozzle arrangement region of the post-processing head 6. Meanwhile, when viewed along the main scanning direction S, the downstream ink head H2 is an ink head whose nozzle arrangement region is connected to or overlaps with the nozzle arrangement region of the post-processing head 6. Note that as described later, the plurality of upstream ink heads H1 may be arranged to align in the conveyance direction F. That is, the ink heads 4 of respective colors may include three or more same-color ink heads along the conveyance direction F.

The storage unit 904 stores in advance various thresholds, parameters, and the like that are referred to by the drive control unit 901, the ejection control unit 902, and the ejection pattern designation unit 903. The storage unit 904 stores combination information, when printing a prescribed pixel in an image formed on the workpiece W with a prescribed ink, of the number of ink heads that can print the pixel in requested density and the ink ejection amount of each ink head (ejection pattern information). In the storage unit 904, there is a plurality of pieces of ejection pattern information stored corresponding to at least one density. If there is a plurality of printable pixel densities, there may be a density that is not stored corresponding to the plurality of pieces of ejection pattern information.

The plurality of pieces of ejection pattern information stored in advance corresponding to one density is, for example, ejection pattern information ejected from two (n) ink heads and ejection pattern information ejected from one (n−1) or less ink heads. In other words, the storage unit 904 stores in advance the above-described information for ejecting ink from the number of ink heads different from each other when forming an image of a prescribed pixel in a prescribed density. In the present embodiment, since two ink heads 4 are arranged for each ink color, as the above information, two types of ejection patterns are stored including the ink ejection pattern by the upstream ink head H1 and the downstream ink head H2 (first ejection pattern, first ejection pattern information), and the ink ejection pattern by only the upstream ink head H1 (second ejection pattern, second ejection pattern information). The ejection pattern designation unit 903 selectively refers to the pattern information.

As the first ejection pattern, a plurality of ejection patterns may be stored in which the ratio of the ink amount of the upstream ink head H1 and the ink amount of the downstream ink head H2 is different. As drive signals for driving ejection elements of the heads 4, 5, and 6, there may be a plurality of different drive signals for ejecting the same amount of liquid. As the ejection pattern, when storing information on the type of drive signal, a plurality of ejection patterns may be stored as each of the first ejection pattern and the second ejection pattern.

As the information, the ink ejection pattern by only the downstream ink head H2 (third ejection pattern, third ejection pattern information) may be stored. Note that as described later, by using the first ejection pattern or the second ejection pattern instead of the third ejection pattern, it is possible to make the decrease in image quality difficult to occur.

<Issue in Head Arrangement>

Figure 18:
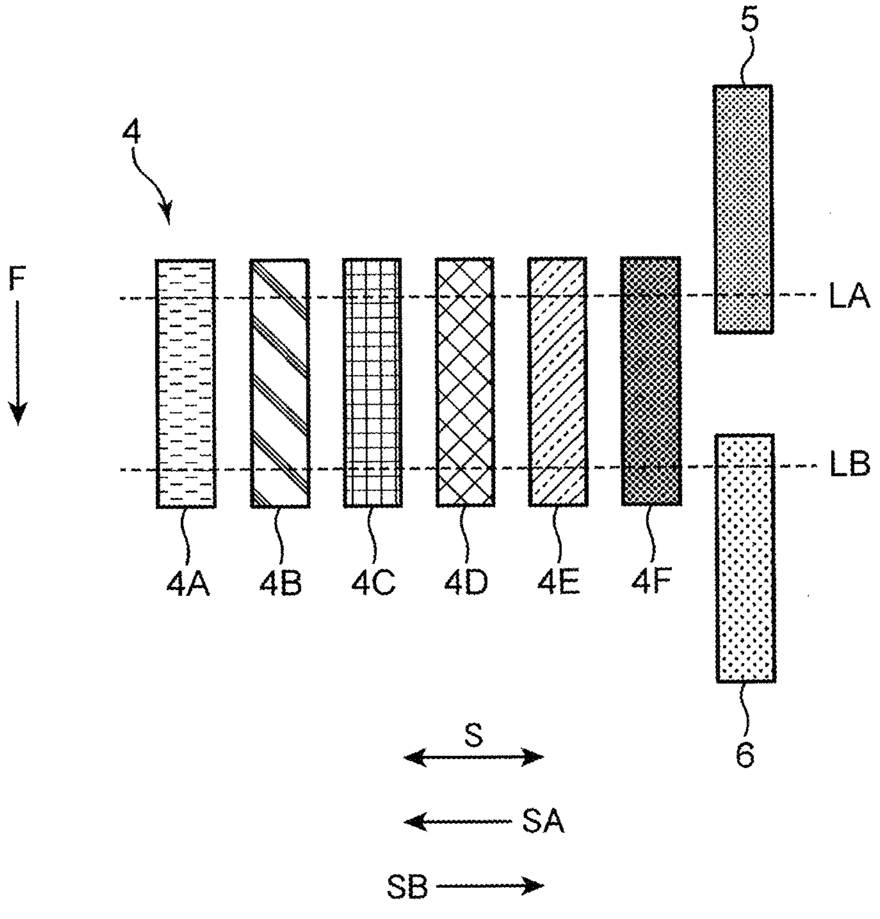
FIG. 18 is a plan view schematically showing arrangement of ink heads and processing heads on a carriage in another inkjet recording device compared with each embodiment of the present disclosure.

FIG. 18 is a plan view schematically showing arrangement of ink heads and processing heads on a carriage in another inkjet recording device compared with each embodiment of the present disclosure. In the inkjet recording device, the first ink head 4A to the sixth ink head 4F that eject inks of respective colors are arranged in a row along the main scanning direction S. The pre-processing head 5 is arranged adjacent to the sixth ink head 4F in the main scanning direction S and on the upstream side of the sixth ink head 4F in the conveyance direction. Furthermore, the post-processing head 6 is arranged adjacent to the sixth ink head 4F in the main scanning direction S and on the downstream side of the sixth ink head 4F in the conveyance direction. The pre-processing head 5 and the post-processing head 6 are arranged at the same position in the main scanning direction S. Note that the nozzles of the ink heads and the processing heads are also arranged continuously in the conveyance direction F as in FIG. 7. As shown in FIG. 18, when the ink heads 4 and the post-processing head 6 are arranged adjacent to each other in the conveyance direction F, if printing is executed with movement of the carriage 3 in a specified direction in the main scanning direction S (that is, whenever bi-directional printing), the post-processing solution may directly affect the pre-processing solution at the head boundary in the conveyance direction F, and the color density of the ink may decrease. Such a phenomenon will be described in detail below.

Figure 19:
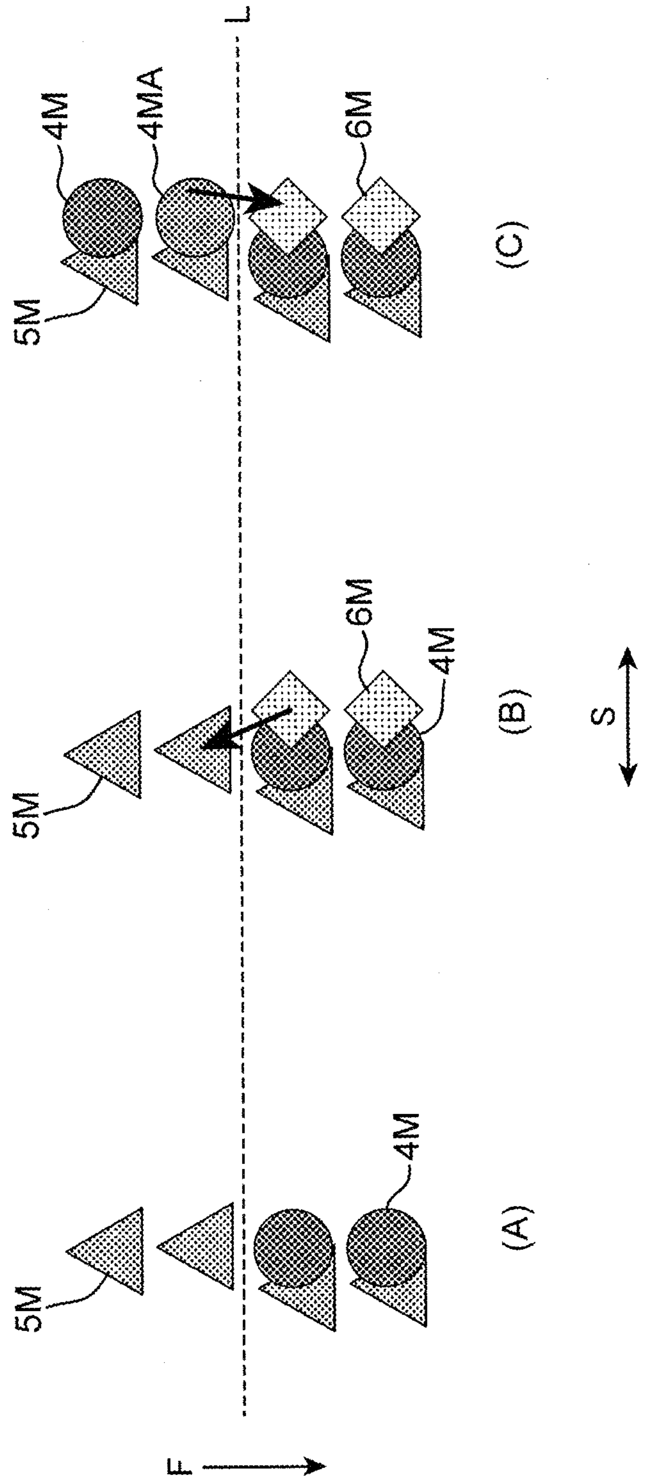
FIG. 19 is a schematic diagram for describing landing of ink and each processing solution on image dots near a head boundary in the inkjet recording device shown in FIG. 18.
Figure 20:
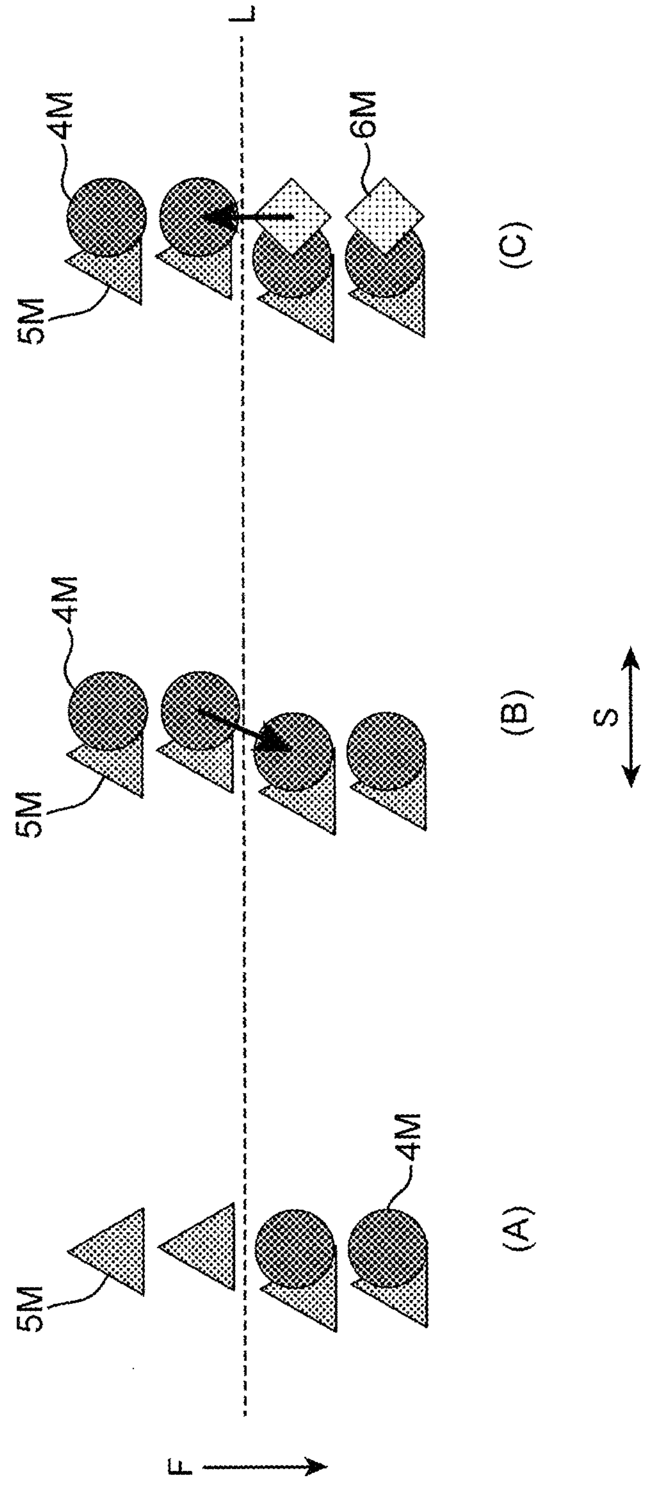
FIG. 20 is a schematic diagram for describing landing of ink and each processing solution on image dots near the head boundary in the inkjet recording device shown in FIG. 18.

FIGS. 19 and 20 are each a schematic diagram for describing landing of the ink and each processing solution on image dots near a head boundary in the inkjet recording device shown in FIG. 18. In FIGS. 19 and 20, triangles indicate a pre-processing solution 5M ejected from the pre-processing head 5, circles indicate an ink 4M ejected from the ink heads 4, and diamonds indicate a post-processing solution 6M ejected from the post-processing head 6. Note that each liquid (4M, 5M, 6M) drawn overlapping in each figure actually lands at the same point, and for the sake of description, each liquid is drawn such that part of the liquid is shifted in the main scanning direction S.

Part A of FIG. 19 (same for part A of FIG. 20) shows a state where a prescribed pixel boundary line L on the workpiece W is located at the boundary LA between the pre-processing head 5 and the ink heads 4 of FIG. 18. On the downstream side of the pixel boundary line L in the conveyance direction F, the ink 4M lands on the pre-processing solution 5M that has previously landed. Meanwhile, on the upstream side of the pixel boundary line L in the conveyance direction F, in the same way as landing of the ink 4M on the downstream side, the pre-processing solution 5M lands with movement of the carriage 3 in the main scanning direction S. That is, the pixel boundary line L is a boundary line for the main scan, which is a boundary between pixels of the main scan in which each liquid lands at different timing.

When the workpiece W is intermittently conveyed in the conveyance direction F from the state of part A of FIG. 19, the pixel boundary line L described above is arranged at the boundary LB between the ink heads 4 and the post-processing head 6 of FIG. 18. Here, when the ink 4M and the post-processing solution 6M are ejected and land with movement of the carriage 3 in the return path direction SB (FIG. 18), since the post-processing head 6 is arranged on the distal side of the ink heads 4 in the return path direction SB as shown in FIG. 18, the post-processing solution 6M first lands in the downstream portion of the pixel boundary line L in the conveyance direction F, as in part B of FIG. 19. At this time, as indicated by the arrow, part of the post-processing solution 6M may flow into the upstream portion of the pixel boundary line L in the conveyance direction F due to landing deviation or bleeding. After that, in the movement of the carriage 3 in the same return path direction SB, the ink 4M lands in the upstream portion of the pixel boundary line L in the conveyance direction F (part C of FIG. 19). At this time, due to the influence of the post-processing solution 6M that has flowed in as described above, the color density of the ink 4M decreases (phenomenon 1: 4MA in part C of FIG. 19).

It is surmised that such a decrease in color density occurs as follows as one example. Originally, when the pre-processing solution 5M and the ink 4M are mixed, cohesion of coloring matters in the ink 4M occurs in an extremely short time. However, it takes a certain amount of time to binding to fibers of the workpiece W. Therefore, if the flow of liquid permeating the fibers of the workpiece W increases within the time from the landing of the ink 4M to the binding, the proportion of coloring matters drawn into the depths of the workpiece W increases and the coloring matters remaining near the surface of the workpiece W decreases, resulting in a lighter color appearance. Note that the pre-processing solution 5M lands in a scan before the scan of landing of the ink 4M. Since the permeation of the pre-processing solution 5M works most strongly immediately after landing, the permeation usually weakens to some extent when the ink 4M lands. However, if the permeation flow increases due to deviation or bleeding of the post-processing solution 6M that lands next in the same scan as the landing of the ink 4M, the color tends to be light as described above.

To describe this phenomenon with reference to FIG. 19, when the post-processing solution 6M acts on the landing portion of the next pre-processing solution 5M due to the bleeding or landing deviation of the post-processing solution 6M as described above, a flow of a mixture of the pre-processing solution 5M and the post-processing solution 6M that permeates the depth of the workpiece W (cloth, paper) occurs. In particular, because of the short time interval from part B of FIG. 19 to the state of part C of FIG. 19 in the same scan, the ink 4M in part C of FIG. 19 lands before such a flow of the mixed liquid stops. Therefore, the proportion of the coloring matter that goes into the depth of the workpiece W in the ink 4M that lands increases, resulting in light color on the workpiece W. Furthermore, the density of the pre-processing solution 5M is reduced by the post-processing solution 6M, the cohesion action of the coloring matter of the ink 4M that lands later is not fully expressed, and the color becomes light similarly. Note that such a phenomenon is remarkable when pigments are contained in the ink, but can also occur when dyes are contained. Therefore, here, the concept including pigments and dyes is expressed as coloring matters.

Note that in part C of FIG. 19, when part of the ink 4M (4MA) that lands on the upstream side of the pixel boundary line L in the conveyance direction F flows into the downstream side of the pixel boundary line L in the conveyance direction F like the arrow, this may act on the post-processing solution 6M that has already landed, and a slight change in the image density may occur (phenomenon 2).

Meanwhile, after part A of FIG. 20 (same as part A of FIG. 19), when the ink 4M and the post-processing solution 6M are ejected and land with movement of the carriage 3 in the forward path direction SA (FIG. 18), since the ink heads 4 are arranged on the distal side of the post-processing head 6 in the forward path direction SA as shown in FIG. 18, the ink 4M first lands in the upstream portion of the pixel boundary line L in the conveyance direction F as in part B of FIG. 20 (note that the ink 4M on the downstream side of the pixel boundary line L in the conveyance direction F in part B of FIG. 20 has landed in the previous scan (part A of FIG. 20)). At this time, as indicated by the arrow of part B of FIG. 20, part of the ink 4M may flow into the downstream portion of the pixel boundary line L in the conveyance direction F due to landing deviation or bleeding of the ink 4M (phenomenon 3).

After that, in the movement of the carriage 3 in the same forward path direction SA, as shown in part C of FIG. 20, when the post-processing solution 6M lands in the downstream portion of the pixel boundary line L in the conveyance direction F, part of the post-processing solution 6M may flow into the upstream portion of the pixel boundary line L in the conveyance direction F due to landing deviation or bleeding (phenomenon 4). Note that in the phenomena 2, 3 and 4, since the post-processing solution 6M does not directly act on the pre-processing solution 5M as in the phenomenon 1, the problem of the change in the image density is smaller than in the phenomenon 1.

To solve the problem based on the above-described phenomena, in the present embodiment, the ink heads 4, the pre-processing head 5, and the post-processing head 6 are suitably arranged on the carriage 3, and the control unit 90 suitably controls the ink ejection pattern from the ink heads 4.

That is, in the present embodiment, as shown in FIGS. 6 and 7, the ink heads 4 of multiple rows in the conveyance direction F are arranged, and the same-color ink can be ejected in each of different scans of the carriage 3. In particular, the nozzle arrangement regions of the ink heads 4 on the upstream side are arranged with a spacing to the nozzle arrangement region of the post-processing head 6 in the conveyance direction F, and the ink 4M can be ejected on the workpiece W in the scan prior to the scan in which the post-processing solution 6M is ejected from the post-processing head 6. Therefore, as in part B of FIG. 19, in a state where the ink 4M does not land immediately on the upstream side of the pixel boundary line L, the post-processing solution 6M does not land immediately on the downstream side of the pixel boundary line L, and it is possible to make it difficult for the image density in part C of FIG. 19 (4MA) to decrease. Note that the ink heads 4 are not limited to two rows and may be arranged in three or more rows.

Figure 10:
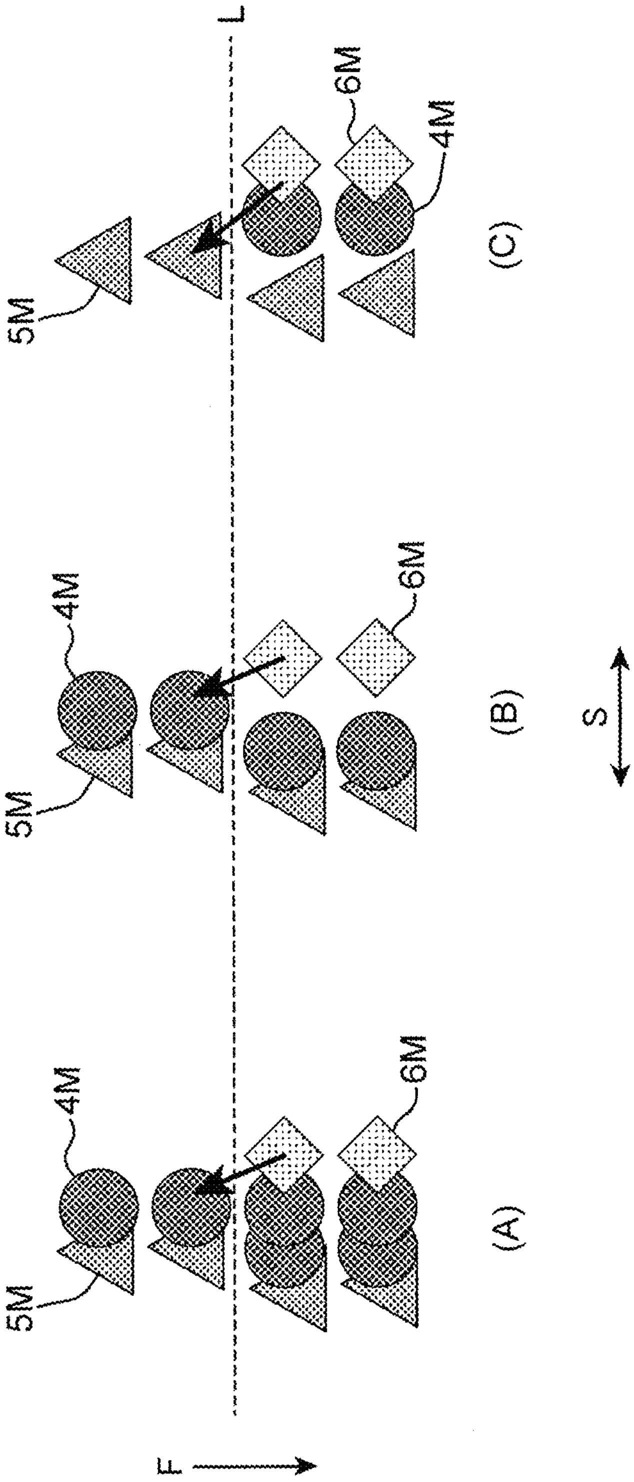
FIG. 10 is a schematic diagram for describing landing of ink and each processing solution on image dots near a head boundary in the inkjet recording device according to the first embodiment of the present disclosure.

FIG. 10 is a schematic diagram for describing landing of the ink and each processing solution on image dots (pixels) near the head boundary in the inkjet printer 1 according to the present embodiment. In the present embodiment, when recording dense pixels on the workpiece W, from among the ejection patterns stored in the storage unit 904, the ejection pattern designation unit 903 (FIG. 8) adopts a pattern to eject the ink 4M with the ink heads 4 of both the first and second rows (upstream ink head H1, downstream ink head H2), and inputs the information in the ejection control unit 902.

As a result, in the situation corresponding to part B of FIG. 19, as shown in part A of FIG. 10, since the ink 4M has already landed on the upstream portion of the pixel boundary line L in the conveyance direction F in the previous scan, it becomes difficult for the post-processing solution 6M to directly act on the pre-processing solution 5M, and the possibility of the image density decreasing as described above can be reduced. By arranging the ink heads 4 in two rows in this way, even if there are high-density pixels that need to be printed by two ink heads, the influence of the post-processing solution 6M can be reduced.

When recording low-density pixels lower than the above-mentioned high-density pixels on the workpiece W, from among the ejection patterns stored in the storage unit 904, the ejection pattern designation unit 903 adopts either one of a pattern in which the ink 4M is ejected by the ink heads 4 of both the first row and second row (first ejection pattern), or a pattern in which the ink 4M is ejected only by the ink heads 4 of the first row (second ejection pattern), and inputs the information to the ejection control unit 902.

Note that in either ejection pattern, the total amount of ink ejected on light pixels is smaller than the total amount of ink ejected on dark pixels. For example, when the density of light pixels is half the density of dark pixels, the total amount of ink in the light pixels is approximately half of the total amount of ink in the dark pixels. In that case, in the first ejection pattern, each of the amount of ink ejected from the two ink heads 4 is, for example, approximately halved. In the second ejection pattern, the amount of ink ejected from the ink heads 4 is almost the same, and since the number of the ink heads 4 to eject is halved, the total amount of ink is approximately halved.

When ejecting the ink 4M by the ink heads 4 of both the first row and second row, in a similar manner to the case of high density (part A of FIG. 10), the possibility of a decrease in the image density can be reduced. When ejecting the ink 4M only by the ink heads 4 of the first row, as shown in part B of FIG. 10, since the ink 4M has already landed on the upstream portion of the pixel boundary line L in the conveyance direction F in the previous scan, it becomes difficult for the post-processing solution 6M to act directly on the pre-processing solution 5M, and the possibility of a decrease in the image density can be reduced similarly.

Although examples of dark pixels and light pixels have been described above, either one or both of the examples may be executed. When the ink 4M is ejected only by the ink heads 4 of the second row, as shown in part C of FIG. 10, since deviation of the post-processing solution 6M or bleeding of the post-processing solution 6M may directly affect the pre-processing solution 5M, it is desirable that the ejection pattern as described above be adopted in both cases.

Note that when ejecting the ink 4M by the ink heads 4 of both the first row and second row, drying of the nozzles of the ink heads 4 of the second row can be made more difficult to occur than when ejecting the ink 4M only by the ink heads 4 of the first row. Note that in this case as well, the ejection amount of the ink 4M ejected from each ink head 4 is halved, but as shown in part A of FIG. 10, by causing the post-processing solution 6M to flow in in a state where at least the ink 4M has landed on the pre-processing solution 5M, it is possible to make it difficult for the pre-processing solution 5M and the post-processing solution 6M to act directly.

As described above, in the present embodiment, since the ejection pattern designation unit 903 appropriately designates the ejection pattern of the ink heads 4 of two rows according to the density difference (gradation representation) formed on the workpiece W, it is possible to prevent a decrease in the image density around the pixel boundary line L and implement stable gradation representation.

Note that when the plurality of same-color ink heads includes n (n is an integer equal to or greater than 2) same-color ink heads arranged at positions different from each other in the conveyance direction F and the ejection pattern designation unit 903 causes n−1 or less same-color ink heads to eject ink based on prescribed image information, it is required at least to designate the ejection ink heads such that out of the n same-color ink heads, the upstream ink heads H1 eject the ink and the downstream ink heads H2 do not eject the ink. In this case as well, it is possible to make it difficult for the density to decrease near the pixel boundary line L.

At this time, the storage unit 904 preferably stores in advance information to be referred to by the ejection pattern designation unit 903 to form an image on the workpiece W in prescribed density, the information including a plurality of pieces of ejection pattern information about the combination of the number of ejection ink heads and the ejection amount of the ink ejected from each of the ejection ink heads. In particular, the ejection pattern information more preferably includes at least the ejection pattern information that causes n same-color ink heads to eject ink (first pattern information) and the ejection pattern information to cause n−1 or less same-color ink heads to eject ink (second pattern information). In this case, when designating the ejection ink heads based on the latter ejection pattern information, the ejection pattern designation unit 903 is required at least to designate the ejection ink heads such that the upstream ink heads H1 eject the ink and the downstream ink heads H2 do not eject the ink. As a result, when it is not necessary to eject ink from all the same-color ink heads, it is possible to make it difficult for the density to decrease near the pixel boundary line L by preferentially blocking ejection of ink from the downstream ink heads H2.

The inkjet printer 1 according to the present embodiment may execute printing only with the ink, printing only with the pre-processing solution and ink, and printing only with the ink and the post-processing solution. In such a case, since the above-described density decrease does not occur, the ink ejection pattern only with the downstream ink heads H2 (third ejection pattern) may be used. The above-described density decrease may vary in influence depending on the combination of the pre-processing solution, the ink, the post-processing solution, and the type of workpiece W, and environmental factors such as temperature and humidity. When the influence of the above-described density decrease is small, the third ejection pattern may be used in favor of improvement in other factors affecting image quality or the like. Furthermore, depending on the degree of influence of the above-described density decrease, the third ejection pattern may be used for specified density, and a pattern other than the third ejection pattern may be used for other density.

The ejection pattern used when the ejection pattern designation unit 903 prints a specified ink in a specified density may be user configurable, or may be user selectable from among the ejection patterns stored in the storage unit 904. For all densities used for printing, by using a mode in which one of the pattern to eject ink from each of the upstream ink heads H1 and the downstream ink heads H2 (first ejection pattern), and the pattern to eject ink from the upstream ink heads H1 and to not eject ink from the downstream ink heads H2 (second ejection pattern) is set, it is possible to execute printing that does not include the third ejection pattern.

Note that the control unit 90 may be able to set an ejection mode in which ejection patterns corresponding to a plurality of densities used for printing are grouped into a specified ejection pattern. Furthermore, the control unit 90 may have an ejection mode in which the ejection pattern that does not include the above-described third ejection pattern is set for all the densities used for printing.

Figure 11:
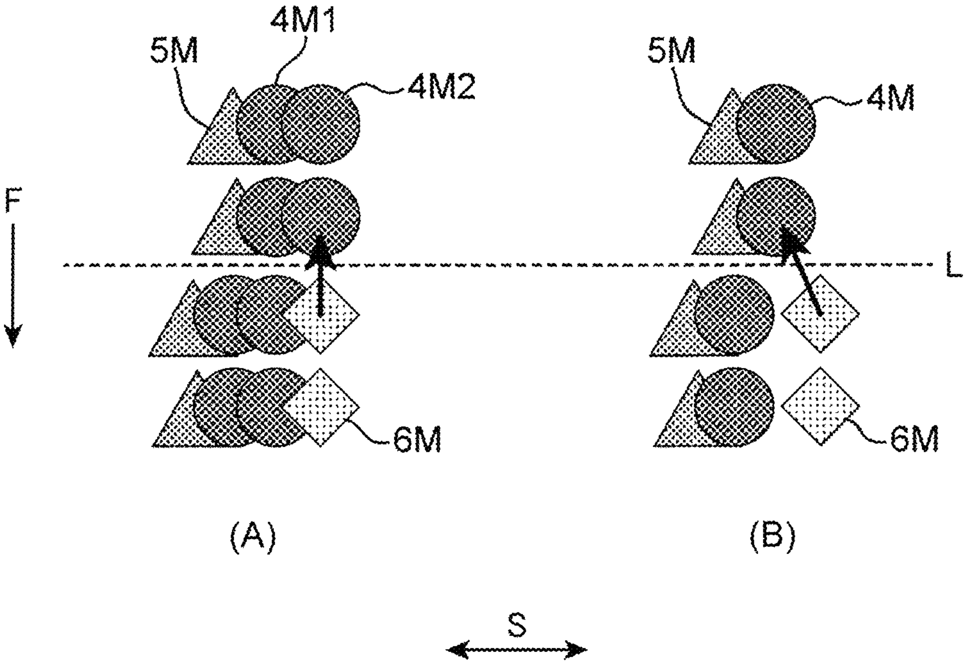
FIG. 11 is a schematic diagram for describing landing of ink and each processing solution on image dots near the head boundary in the inkjet recording device according to the first embodiment of the present disclosure.

FIG. 11 is a schematic diagram for describing landing of ink and each processing solution on image dots near the head boundary in the inkjet recording device according to the present embodiment. As described above, out of the phenomena 1 to 4 described with reference to FIGS. 18 to 20, the phenomena 2, 3, and 4 are less likely to lead to a large change in the image density than the phenomenon 1, but the phenomenon 4, indicated by the arrow in part C of FIG. 20, may cause the image density to decrease somewhat, although less than the phenomenon 1.

The inkjet printer 1 according to the present embodiment can also reduce the decrease in the image density based on such a phenomenon 4. As described above, in the state shown in part B and part C of FIG. 20, during the prescribed scan of the carriage 3, the ink 4M may land first and the landing of the adjacent post-processing solution 6M may deviate or bleed. Therefore, since the time from the landing of the ink 4M to the influence of the post-processing solution 6M is greatly more shortened than the case where the post-processing solution 6M lands in the original next scan, the cohesive pigments may be washed away deep into the fibers together with the post-processing solution 6M before well binding to fibers of the workpiece W, resulting in a decrease in density.

Meanwhile, in the present embodiment, for example, when printing high-density pixels, as shown in part A of FIG. 11, the ink 4M of the upstream ink heads H1 lands one scanning time or more before the post-processing solution 6M lands. Since a prescribed time has passed after the ink 4M1 of the upstream ink heads H1 has been mixed with the pre-processing solution 5M, even if the post-processing solution 6M deviates or bleeds at an early timing after the ink 4M2 of the downstream ink heads H2 has landed, the influence will be small.

With reference to part B of FIG. 11, in the present embodiment, when printing low-density pixels, by ejecting the ink 4M from at least the upstream ink heads H1, when the post-processing solution 6M lands, a sufficient time has passed after the ink 4M has been mixed with the pre-processing solution 5M. Therefore, even if the post-processing solution 6M deviates or bleeds, the influence is small.

In this way, in the present embodiment, it is possible to make the decrease in image density based on the phenomenon 4 difficult to occur. Note that in the phenomenon 3 indicated by the arrow of part B of FIG. 20, since the new ink 4M flows into the ink 4M that has already landed, it is less likely to lead to a large change in density than the phenomenon as described above in which the post-processing solution 6M acts on the pre-processing solution 5M.

Furthermore, with the head arrangement according to the present embodiment, it is possible to increase the ejection amount of the necessary ink and processing solution while miniaturizing the carriage 3. That is, by arranging the pre-processing head 5 and the post-processing head 6 at different positions from the ink heads 4 in the conveyance direction F, it is possible to shorten the length of the carriage in the main scanning direction required for mounting the heads 4 to 6, while arranging the ink heads 4A to 4F that can eject the required amount of ink in the main scanning direction S, and while enabling the print processing in both the forward path main scan and the return path main scan.

In particular, the first to sixth ink heads 4A to 4F include the upstream ink heads H1 (4A1 to 4F1) and the downstream ink heads H2 (4A2 to 4F2) arranged in the conveyance direction F (direction that intersects the arrangement direction of the plurality of processing heads), respectively. Therefore, in order to increase the ejection amount of ink of respective colors, or even if the number of the ink heads 4 is increased in order to increase the number of colors, it is possible to make it difficult to increase the length of the carriage 3 in the main scanning direction.

The pre-processing head 5 and the post-processing head 6 are arranged within the range of the arrangement width H of the first to sixth ink heads 4A to 4F in the main scanning direction S (FIG. 6). Therefore, even if the pre-processing head 5 and the post-processing head 6 are mounted on the carriage 3 in addition to the ink heads 4, there is no need to extend the length of the carriage 3 in the main scanning direction. That is, it is possible to make it difficult to increase the length of the carriage 3 in the main scanning direction.

Furthermore, the pre-processing head 5 and the post-processing head 6 are arranged such that part of the heads enters between the array pitch of the first to sixth ink heads 4A to 4F. With such a staggered arrangement, the ink heads 4 and the processing heads 5 and 6 arranged at different positions in the conveyance direction F can be arranged in high density in the conveyance direction F. Therefore, it is possible to reduce the length of the carriage 3 in the conveyance direction F.

In the head arrangement in the present embodiment, one pre-processing head 5 is arranged on the upstream side of the ink heads 4, and one post-processing head 6 is arranged on the downstream side in the conveyance direction F. That is, it is possible to provide the all-in-one inkjet printer 1 in which three types of ejection heads for the pre-processing solution, the ink, and the post-processing solution are mounted on one carriage 3. Since the pre-processing head 5, the ink heads 4, and the post-processing head 6 are arranged sequentially in the conveyance direction F, the pre-processing solution, the ink, and the post-processing solution can be ejected in the desired landing order in both the forward path main scan and the return path main scan.

In the present embodiment, the post-processing head 6 is arranged outside the arrangement range HB where the downstream ink heads H2 (4A2 to 4F2) of respective colors are arranged in the main scanning direction S (FIG. 6). With such arrangement, the number of downstream ink heads H2 close to the post-processing head 6 in the main scanning direction S can be reduced. It is also possible to reduce the average value of distances in the main scanning direction S between the post-processing head 6 and the downstream ink heads H2 of respective colors. As a result, it is possible to reduce the occurrence of the phenomena described in FIGS. 18 to 20. Note that when a plurality of the post-processing heads 6 is arranged, as described later, all the post-processing heads 6 are preferably arranged outside the arrangement range, but at least part of the post-processing heads 6 may be arranged outside the arrangement range.

In the present embodiment, the post-processing head 6 is arranged such that part of the head overlaps with the plurality of downstream ink heads 2H included in the plurality of sets of same-color ink heads in the conveyance direction F, and is arranged at the same position as one upstream ink head (4F1 of FIG. 9) among the plurality of upstream ink heads included in the plurality of sets of same-color ink heads in the main scanning direction S. With such a configuration, the size of the carriage 3 on which the ink heads 4, the pre-processing head 5, and the post-processing head 6 are mounted can be made compact in the main scanning direction S and the conveyance direction F.

Furthermore, in the present embodiment, the carriage 3 includes the back frame 32 (engagement unit) held in a cantilevered state by the guide rails 17 (holding member). By causing the timing belt 16 to cantilever the carriage 3, the structure can be simplified. In addition, by cantilevering the carriage, it is possible to easily create a structure in which the downstream side of the carriage 3 is open, and to make it easy to maintain the ink heads 4 and the processing heads 5 and 6.

In the carriage 3 that is thus cantilevered, the pre-processing head 5 is arranged on the proximal side 311 (close side to the engagement unit) of the head support frame 31, and the post-processing head 6 is arranged on the distal side 312 (far side from the engagement unit). Unlike the proximal side 311 close to the back frame 32 fixed to the timing belt 16, it is assumed that the positional precision on the distal side 312, which is a free end, will decrease. However, on the distal side 312, the post-processing head 6, which does not require relatively high degree of severe ejection precision, is mounted. Since the post-processing solution coats the ink image printed on the workpiece W, even if deviation of the landing position occurs, the relative influence on the image quality can be made smaller than deviation of the landing position of the same degree in the pre-processing solution. Therefore, even when the cantilevered carriage 3 is used, it is possible to make the decrease in image quality difficult to occur. Furthermore, even if deviation occurs in the landing position of the post-processing solution, it is possible to stably make it difficult for the image density to decrease near the pixel boundary line L, as described above.

Note that in the head arrangement shown in FIGS. 6, 7, and 9, an aspect in which the downstream ink heads H2 of the second row of respective colors are not arranged may be adopted. That is, in this case, there may be the ink heads 4 of only one row. However, in this case, the post-processing head 6 in the conveyance direction F is preferably arranged with a spacing on the downstream side of the upstream ink heads H1 of the first row in the conveyance direction F, as shown in each figure above. That is, the nozzle arrangement region in which the ink 4M is ejected from the ink heads 4 is preferably arranged away from the nozzle arrangement region in which the post-processing solution 6M is ejected from the post-processing head 6 on the upstream side in the conveyance direction F. Note that assuming such a positional relationship, the upstream ink heads H1 may be arranged in a plurality of rows. With such a head arrangement, the landing position of the post-processing solution 6M is not adjacent to the landing position of the ink 4M in the conveyance direction F as in part B of FIG. 19.

In this case, the inkjet printer 1 includes the workpiece conveyance unit 20 that conveys the workpiece W in the prescribed conveyance direction F, the carriage 3 that reciprocates in the main scanning direction S that intersects the conveyance direction F, the ink heads 4 mounted on the carriage 3 and each ejecting the ink, at least one pre-processing head 5 arranged on the upstream side of the ink heads 4 in the conveyance direction F and ejecting the pre-processing solution that does not produce color, and at least one post-processing head 6 arranged on the downstream side of the plurality of ink heads 4 in the conveyance direction F and ejecting the post-processing solution that does not produce color. The nozzle arrangement regions of the ink heads 4 are arranged with a spacing from the nozzle arrangement region of the post-processing head 6 arranged on the downstream side in the conveyance direction F.

Next, head arrangement in a carriage 3 of an inkjet printer 1 according to other embodiments of the present disclosure will be described. Note that in the following embodiments, differences from the first embodiment will be mainly described, and description of common points will be omitted.

Figure 12:
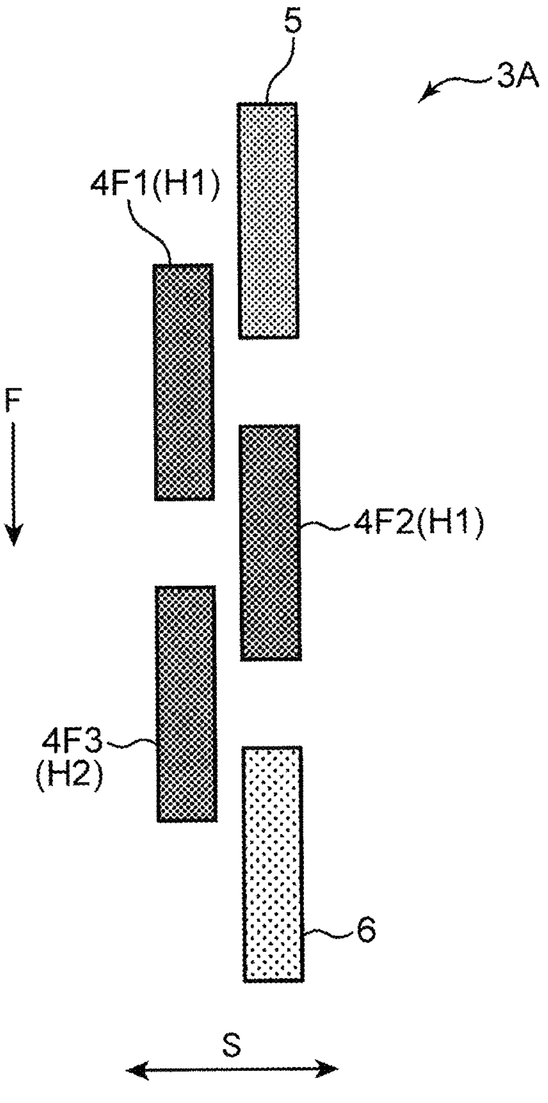
FIG. 12 is a schematic plan view showing upstream ink heads and downstream ink heads in an inkjet recording device according to a second embodiment of the present disclosure.

FIG. 12 is a schematic plan view showing upstream ink heads H1 and downstream ink heads H2 on a carriage 3A of an inkjet printer 1 (inkjet recording device) according to a second embodiment of the present disclosure. The first embodiment has described an aspect in which one upstream ink head H1 and one downstream ink head H2 are provided as ink heads 4 of respective colors, as shown in FIG. 9. In the present embodiment, as shown in FIG. 12, the upstream ink heads H1 include heads of two rows (4F1, 4F2) arranged at different positions in the conveyance direction F, and the downstream ink heads H2 include heads of one row (4F3) in a similar manner to the first embodiment. Note that FIG. 12 shows only the sixth ink heads 4F in black, but the same applies to the ink heads of other colors. In the present embodiment as well, the heads are arranged in a staggered pattern.

In the present embodiment, the nozzle arrangement region of the downstream ink heads H2 (4F3) is continuous (connected, adjacent) with the nozzle arrangement region of the post-processing head 6 along the conveyance direction F. Meanwhile, the nozzle arrangement region of the upstream ink heads H1 (4F1, 4F2) is arranged with a spacing to the nozzle arrangement region of the post-processing head 6 in the conveyance direction F. Therefore, in the present embodiment as well, by ejecting an ink from at least the upstream ink heads H1 to a prescribed pixel, it is possible to make it difficult for the image density to decrease near the pixel boundary line L.

At this time, for the image density required for the prescribed pixel, by the ejection pattern designation unit 903 adopting a pattern of dispersedly ejecting the ink from three heads, the upstream ink heads H1 and the downstream ink head H2, in a similar manner to part A of FIG. 10 and part B of FIG. 10, when at least the post-processing solution 6M ejected from the post-processing head 6 lands at the prescribed pixel position, since the ink 4M has landed on the pre-processing solution 5M in advance, it becomes difficult for the post-processing solution 6M to act directly on the pre-processing solution 5M.

When ejecting the ink dispersedly from two heads for the image density required for the prescribed pixel, the ejection pattern designation unit 903 may eject the ink from the two heads of the upstream ink heads H1. Furthermore, when n (n is an integer equal to or greater than 3) same-color ink heads arranged at positions different from each other in the conveyance direction F are arranged for the ink heads of respective colors and the ejection pattern designation unit 903 causes n−2 or less same-color ink heads to eject the ink based on prescribed image information, it is required at least to designate the ejection ink head preferentially from the same-color ink heads located upstream in the conveyance direction F among the plurality of upstream ink heads H1. With such a configuration, since the ink is ejected from the ink head on the more upstream side, the post-processing solution 6M lands after the pre-processing solution 5M and the ink 4M act sufficiently. As a result, it becomes more difficult for the post-processing solution 6M to act directly on the pre-processing solution 5M.

In the present embodiment as well, the storage unit 904 may store information to be referred to by the ejection pattern designation unit 903 to form an image on the workpiece W in prescribed density, the information including one or more pieces of ejection pattern information about the combination of the number of ejection ink heads and the ejection amount of the ink ejected from each of the ejection ink heads. When a plurality of pieces of ejection pattern information stored in association with at least one density and having different numbers of ejection ink heads (specified ejection pattern information) is included in the ejection pattern information, the ejection pattern designation unit 903 may select the ejection pattern information with the smallest number of ejection ink heads and designate the ejection ink head when recording an image in the density in which the plurality of pieces of specified ejection pattern information is stored in association. In this case as well, by preferentially ejecting the ink from the ink heads arranged on the upstream side in the conveyance direction F with the least possible number of ink heads, it becomes even more difficult for the post-processing solution 6M to directly act on the pre-processing solution 5M.

Figure 13:
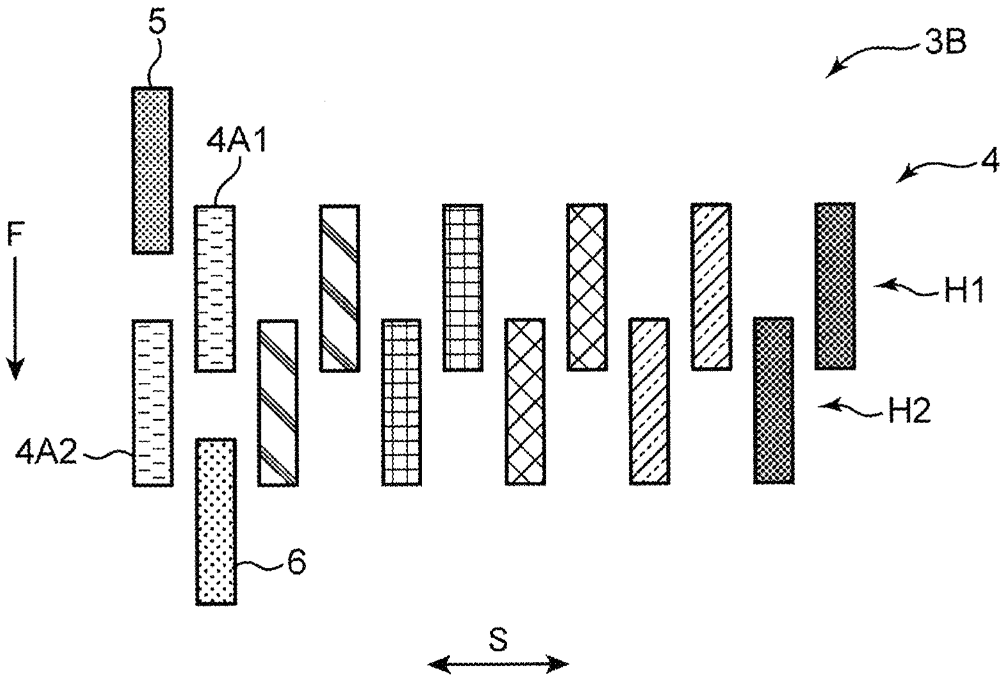
FIG. 13 is a plan view schematically showing arrangement of ink heads and processing heads on a carriage in an inkjet recording device according to a third embodiment of the present disclosure.

FIG. 13 is a plan view schematically showing arrangement of ink heads and processing heads on a carriage 3B in an inkjet printer 1 according to a third embodiment of the present disclosure. The first embodiment has described an aspect in which the pre-processing head 5 and the post-processing head 6 are arranged at the right end of the ink heads 4, but an aspect in which the pre-processing head 5 and the post-processing head 6 are arranged at the left end of the ink heads 4 may be adopted, as shown in FIG. 13. In this case as well, by ejecting an ink from at least the upstream ink head (for example, 4A1) out of the ink heads 4, it becomes difficult for the post-processing solution 6M to act directly on the pre-processing solution 5M near the pixel boundary line L.

Figure 14:
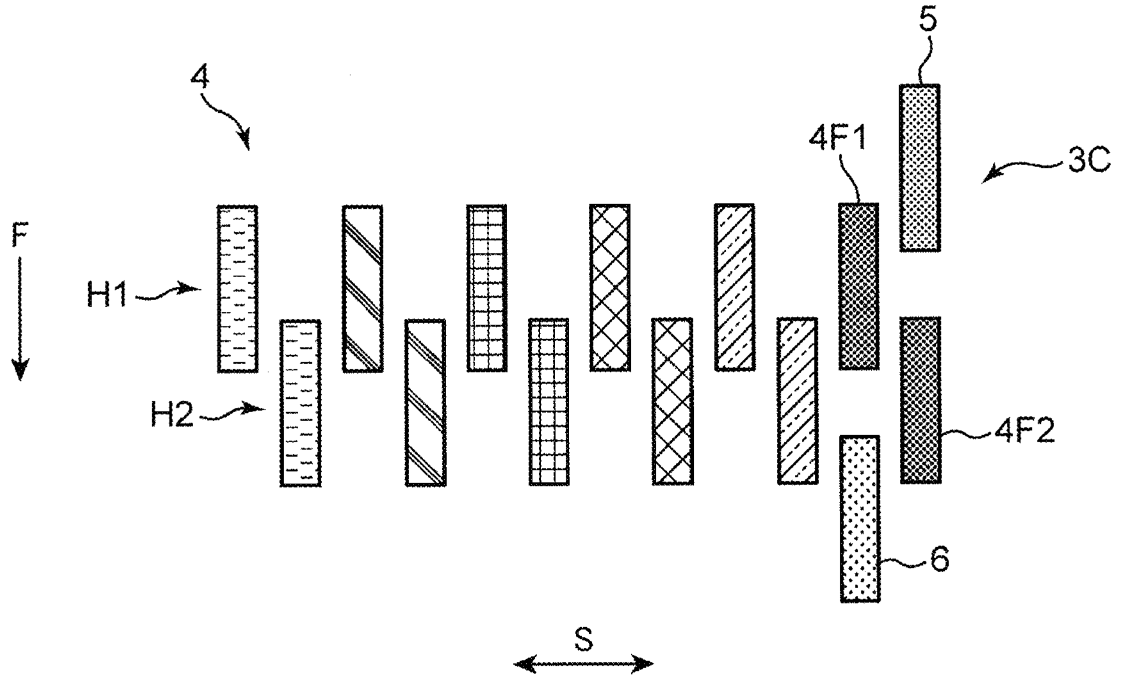
FIG. 14 is a plan view schematically showing arrangement of ink heads and processing heads on a carriage in an inkjet recording device according to a fourth embodiment of the present disclosure.

FIG. 14 is a plan view schematically showing arrangement of ink heads and processing heads on a carriage 3C in an inkjet printer 1 according to a fourth embodiment of the present disclosure. The first embodiment has described an aspect in which the upstream ink heads H1 are arranged on the right side of the downstream ink heads H2 for the ink heads of respective colors, but as shown in FIG. 14, the upstream ink heads may be arranged on the left side of the downstream ink heads. In this case as well, since the ink heads 4, the pre-processing head 5, and the post-processing head 6 are arranged in a staggered pattern, the head arrangement region on the carriage 3 can be set compactly. Note that in both aspects of FIGS. 13 and 14, as in the first embodiment, since the heads are arranged in a staggered pattern, and the pre-processing head 5 and the post-processing head 6 are arranged within the arrangement range of the ink heads 4 in the main scanning direction S, it is possible to further make the size of the carriage 3 more compact in the main scanning direction S and the conveyance direction F.

Figure 15:
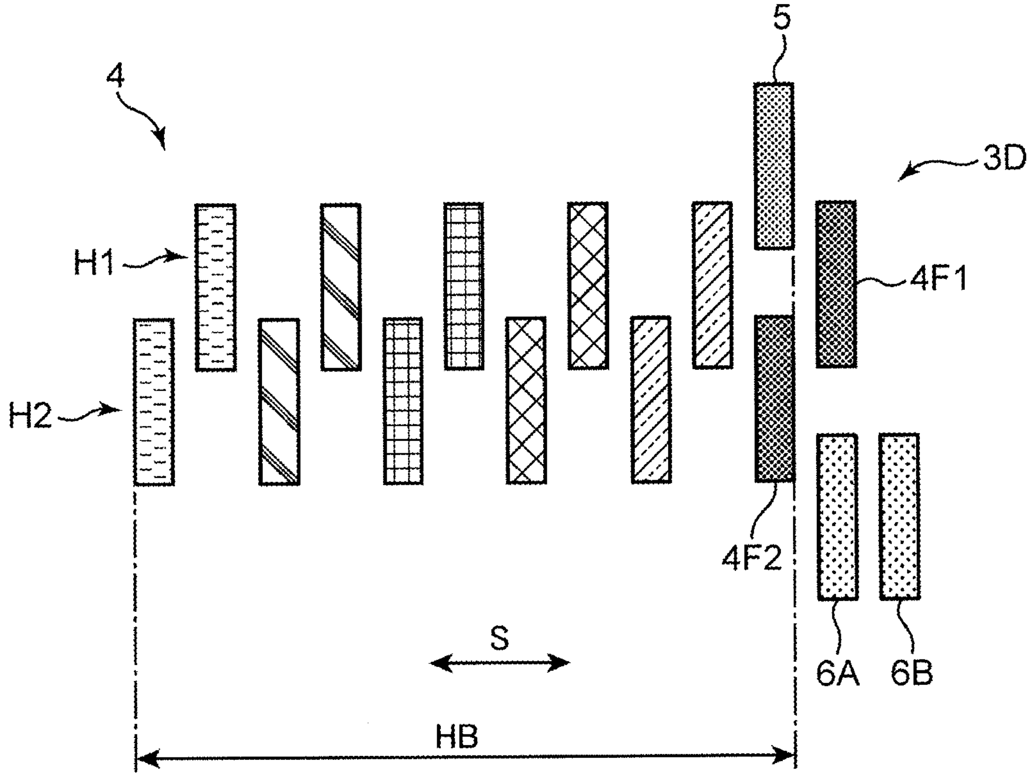
FIG. 15 is a plan view schematically showing arrangement of ink heads and processing heads on a carriage in an inkjet recording device according to a fifth embodiment of the present disclosure.

FIG. 15 is a plan view schematically showing arrangement of ink heads and processing heads on a carriage 3D in an inkjet printer 1 according to a fifth embodiment of the present disclosure. The first embodiment has described an aspect in which one pre-processing head 5 and one post-processing head 6 are arranged, but as shown in FIG. 15, an aspect in which two post-processing heads 6A and 6B arranged at positions different from each other in the main scanning direction S are provided may be adopted. In this case, the post-processing heads 6A and 6B are arranged to align in the main scanning direction S outside the arrangement range HB where the downstream ink heads H2 of respective colors are arranged in the main scanning direction S. With such arrangement, the number of downstream ink heads H2 close to the post-processing heads 6A and 6B in the main scanning direction S can be reduced. It is also possible to reduce the average value of distances in the main scanning direction S between the post-processing heads 6A and 6B and the downstream ink heads H2 of respective colors. As a result, it is possible to reduce the occurrence of the phenomena described in FIGS. 18 to 20. In the present embodiment, since the post-processing heads 6 include the plurality of post-processing heads 6A and 6B, even if the ejection amount of the post-processing solution is insufficient with a single head, the required amount can be ejected by arranging the plurality of post-processing heads 6A and 6B. Note that the number of the post-processing heads in FIG. 15 may be three or more.

Figure 16:
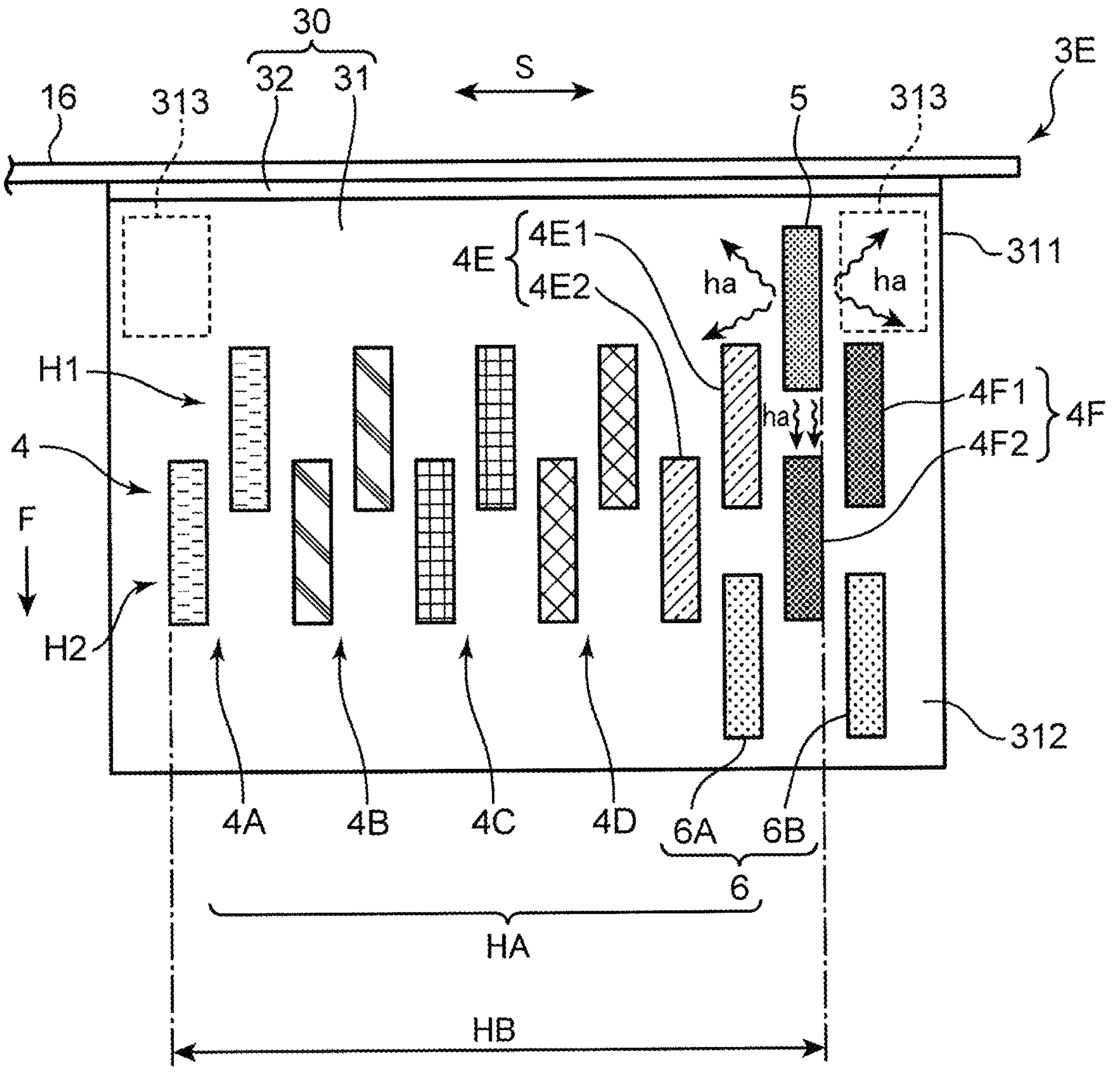
FIG. 16 is a plan view schematically showing arrangement of ink heads and processing heads on a carriage in an inkjet recording device according to a sixth embodiment of the present disclosure.

FIG. 16 is a plan view schematically showing arrangement of ink heads and processing heads on a carriage 3E in an inkjet printer 1 according to a sixth embodiment of the present disclosure.

In the present embodiment as well, in the carriage 3E, a back frame 32 (engagement unit) is held in a cantilevered state by guide rails 17 (holding member) (FIGS. 1 and 2). On a head support frame 31, ink heads 4 including first to sixth ink heads 4A to 4F, one pre-processing head 5, and post-processing heads 6 including two post-processing heads 6A and 6B are mounted. In the present embodiment as well, by ejecting an ink from at least the ink heads 4 on the upstream side in the conveyance direction F to the prescribed pixel, it becomes difficult for the post-processing solution 6M to directly act on the pre-processing solution 5M and for the image density to decrease near the pixel boundary line L.

The present embodiment also includes the post-processing heads 6A and 6B arranged at positions different from each other in the main scanning direction S. Here, as shown in FIG. 16, the post-processing head 6B is arranged outside the arrangement range HB of the plurality of downstream ink heads H2 included in the plurality of sets of same-color ink heads in the main scanning direction S (first post-processing head). Meanwhile, the post-processing head 6A is arranged such that part of the head enters between one pair of the downstream ink heads H2 adjacent to each other in the main scanning direction S among the plurality of downstream ink heads H2, and is arranged to align with the post-processing head 6B in the main scanning direction S (second post-processing head). With such arrangement, the number of ink heads close to the plurality of post-processing heads 6A and 6B in the main scanning direction S can be reduced. It is also possible to reduce the average value of distances in the main scanning direction S between the post-processing heads 6A and 6B and the downstream ink heads of respective colors. While producing such an effect, the size of the carriage 3 in the main scanning direction S can be made compact.

In the present embodiment, the pre-processing head 5 includes one unit head, and the post-processing heads 6 include two unit heads (post-processing heads 6A and 6B). Among the pre-processing head 5 and the post-processing heads 6, the pre-processing head 5 having a small number of unit heads is arranged on the proximal side 311 of the head support frame 31. The post-processing heads 6 having a large number of unit heads are arranged on the distal side 312. In other words, the upstream edge of the head support frame 31 in the conveyance direction F is the side held by the guide rails 17.

As described above, the processing heads 5 and 6 generate heat by ejection operations. As schematically shown in FIG. 16, the heated pre-processing head 5 dissipates heat ha. The post-processing heads 6A and 6B also dissipate heat similarly. The head support frame 31 of the carriage 3E is heated by the heat ha, which can lead to thermal deformation in the head support frame 31, the back frame 32 that is a structure holding the head support frame, a fixing bracket between the back frame 32 and the timing belt 16, and the like. The thermal deformation can give influence to the precision of landing of the ink ejected from the ink heads 4 in the carriage 3E held in a cantilevered state.

However, in the carriage 3E according to the present embodiment, the pre-processing head 5 having a small number of unit heads is arranged on the proximal side 311, which is the cantilevered side of the head support frame 31. With this arrangement, the influence by thermal deformation (decrease in landing precision) can be reduced. If the post-processing head 6 having a large number of unit heads is arranged on the proximal side 311, the back frame 32 receives dissipation of heat ha from two unit heads, and becomes hotter and more susceptible to thermal deformation.

In the carriage 3E, the pre-processing head 5 arranged on the side closest to the back frame 32 of the carriage 3E is arranged at a position except for the end of the array HA of the ink heads 4 and the processing heads 5 and 6 in the main scanning direction S. Among the heads 4, 5, and 6 mounted on the carriage 3E, the pre-processing head 5 is a head arranged on the side closest to the back frame 32 (engagement unit). Such a pre-processing head 5 is arranged at a position except for the arrangement end 313, which is the end of the head array HA.

Since the carriage 3E cannot increase the size unnecessarily, if a head is arranged at the arrangement end 313 of the head array in the main scanning direction S, the head will be a head closest to the corner of the carriage 3E (head support frame 31) in the main scanning direction S. Since the arrangement end 313 is also near the cantilevered back frame 32, thermal deformation that occurs near the arrangement end can induce vertical and horizontal distortion and misalignment of the head support frame 31. This reduces the landing position precision of the heads 4, 5, and 6 mounted on the carriage 3E. Therefore, by not arranging the pre-processing head 5 that becomes hot in the region of the arrangement end 313, it is possible to make it difficult for the above-described problem of thermal deformation to occur.

In the present embodiment as well, among two rows of the ink heads 4, the row of the heads 4 arranged on the engagement unit side (upstream ink heads H1) has staggered arrangement at a position shifted to the right in FIG. 16. Furthermore, the pre-processing head 5, which is a processing head with a smaller number of heads, is arranged on the engagement unit side, and the pre-processing head 5 is arranged on the rightmost side of the staggered arrangement. With such arrangement, the heads can be arranged such that the processing heads are not arranged on the arrangement end 313.

In the present embodiment, compared to the arrangement of FIG. 15 that is similar in that the plurality of post-processing heads 6 is arranged, since the post-processing heads 6A and 6B are arranged within the arrangement range of the ink heads 4 in the main scanning direction S, the size of the carriage 3E can be made compact.

Figure 17:
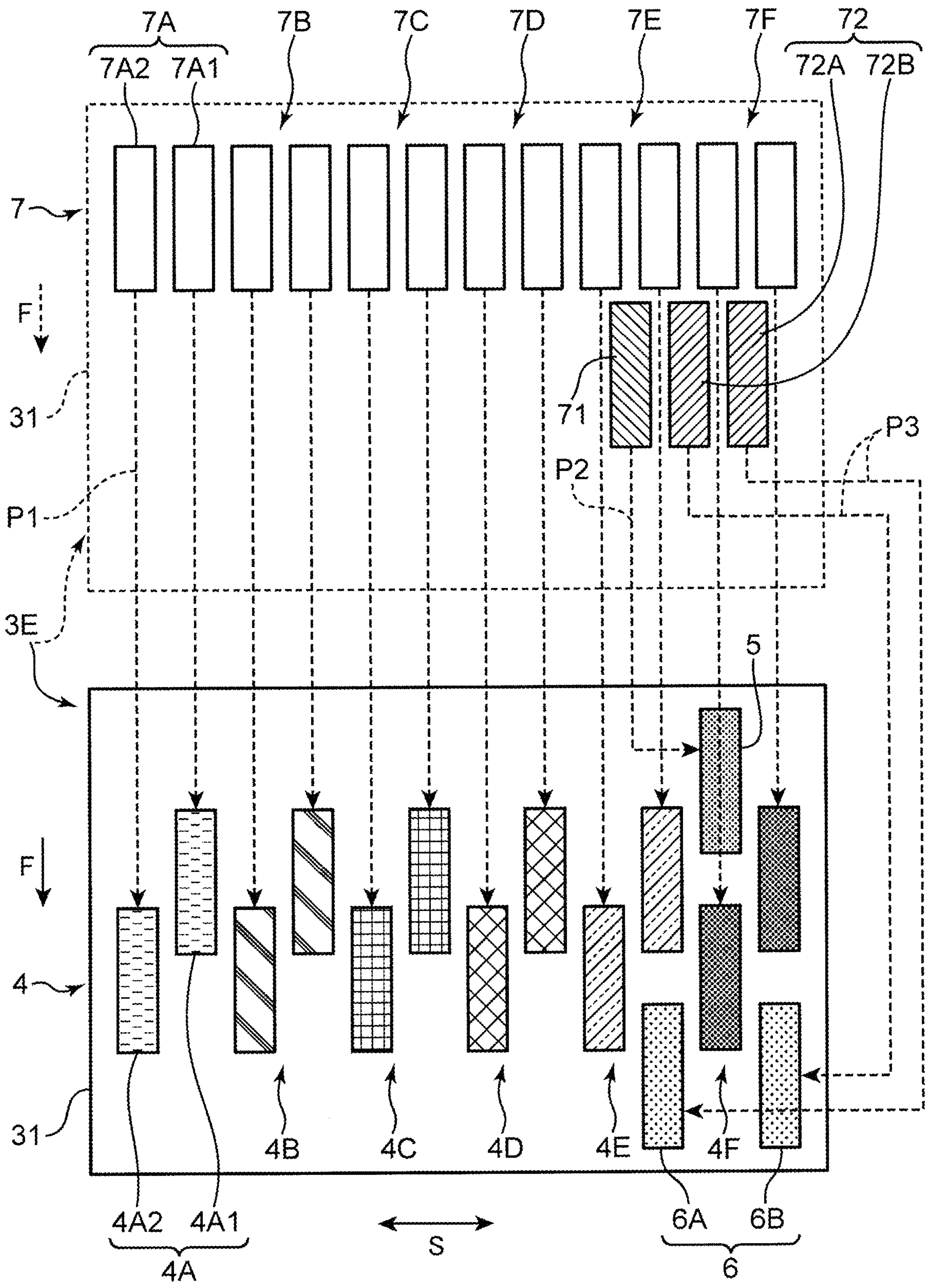
FIG. 17 is a plan view schematically showing arrangement of ink heads, processing heads, and sub-tanks on the carriage in the inkjet recording device according to the sixth embodiment of the present disclosure.

FIG. 17 is a plan view schematically showing arrangement of ink heads, processing heads, and sub-tanks on the carriage 3E in the inkjet printer 1 according to the present embodiment. The following is an exemplification of a preferred arrangement relationship between the heads 4, 5, and 6 and the sub-tanks that supply the heads with the ink or the processing solution on the carriage 3E.

The sub-tanks 7 are also mounted on the carriage 3E. The sub-tanks 7 include ink sub-tanks 7A to 7F, a pre-processing solution sub-tank 71, and post-processing solution sub-tanks 72. The sub-tanks 7 are each supplied with the ink, the pre-processing solution, and the post-processing solution from a main tank (not shown). The ink sub-tanks 7A to 7F supply the ink to the first to sixth ink heads 4A to 4F, respectively. For example, the upstream ink head 4A1 of the first ink heads 4A is supplied with the first color ink from a first tank 7A1 of the ink sub-tanks 7A via a pipeline P1, and the downstream ink head 4A2 is supplied with the first color ink from a second tank 7A2. The second to sixth ink heads 4B to 4F also have a structure in which the inks of the second to sixth colors are supplied similarly. The arrangement order of the ink sub-tanks 7 in the main scanning direction S is the same as the arrangement order of the ink heads 4 to which the ink sub-tanks 7 supply the ink in the main scanning direction S.

Note that one ink sub-tank 7 may supply the ink to a plurality of the ink heads 4 that eject the same-color ink. In this case, the ink heads 4 that share the ink sub-tank 7 may be arranged at a definite position in the main scanning direction S. Furthermore, the ink heads 4 that eject the same ink are preferably arranged together in the main scanning direction S, and in the main scanning direction S, the arrangement order of the ink sub-tanks 7 of respective colors may be the same as the arrangement order of the ink heads 4 of respective colors.

The pre-processing solution sub-tank 71 supplies the pre-processing solution to the pre-processing head 5 via a pipeline P2. The post-processing solution sub-tanks 72 include a first tank 72A and a second tank 72B. The first and second tanks 72A and 72B supply the post-processing solution to the post-processing heads 6A and 6B via a pipeline P3, respectively.

The ink sub-tanks 7A to 7F are mounted on the carriage 3E to align in the main scanning direction S. The processing solution sub-tanks 71 and 72 are arranged to align in the main scanning direction S at positions different from positions of the ink sub-tanks 7A to 7F in the conveyance direction F. Specifically, the pre-processing solution sub-tank 71 and the first and second tanks 72A and 72B of the post-processing solution sub-tanks 72 align in the main scanning direction S on the downstream side of the ink sub-tanks 7A to 7F in the conveyance direction F. Note that only the pre-processing solution sub-tank 71 may be arranged on the upstream side of the ink sub-tanks 7A to 7F.

The acceleration in the main scanning direction S acts on the liquid in the sub-tanks 7 mounted on the carriage 3E that reciprocates in the main scanning direction S. The sub-tanks 7 and respective heads 4, 5, and 6 are connected by the pipelines P1, P2, and P3. If the sub-tanks 7 are widely distributed on the carriage 3J, the arrangement range of the pipelines P1 to P3 in the main scanning direction S is also large. Since the pipelines P1 to P3 are also filled with the ink or the processing solution, meniscus destruction may occur in the ejection portions of the heads 4, 5, and 6 under the influence of the acceleration.

However, with the configuration of the present embodiment, the ink sub-tanks 7A to 7F are mounted on the carriage 3E to align in the main scanning direction S, in a similar manner to the first to sixth ink heads 4A to 4F. Therefore, the ink sub-tanks 7A to 7F can be arranged in a relatively narrow range on the head support frame 31 of the carriage 3J. Similarly, the pre-processing solution sub-tank 71 and the post-processing solution sub-tanks 72 can also be arranged in a relatively narrow range on the head support frame 31 of the carriage 3E.

Furthermore, since the pre-processing solution sub-tank 71 and the post-processing solution sub-tanks 72 are arranged at positions different from positions of the ink sub-tanks 7A to 7F in the conveyance direction F, positional difference in the main scanning direction S can be reduced in the arrangement of the pre-processing solution sub-tank 71 and the post-processing solution sub-tanks 72, and the processing heads to which the pre-processing solution sub-tank 71 and the post-processing solution sub-tanks 72 supply the processing solutions. This makes it possible to reduce the distribution range of the pre-processing solution existing in connection in the pre-processing solution sub-tank 71, the pipeline P, and the pre-processing head 5 in the main scanning direction S, and to make it difficult to be affected by the acceleration. Similarly, it is possible to reduce the distribution range of the post-processing solution existing in connection in the main scanning direction S, and to make it difficult to be affected by the acceleration.

Similarly, the positional difference in the main scanning direction S can be reduced in the arrangement between the ink sub-tanks 7A to 7F and the ink heads 4 to which the ink sub-tanks 7A to 7F supply the ink. This makes it possible to reduce the distribution range of the ink existing in connection in the main scanning direction S, and to make it difficult to be affected by the acceleration.

Figure 21:
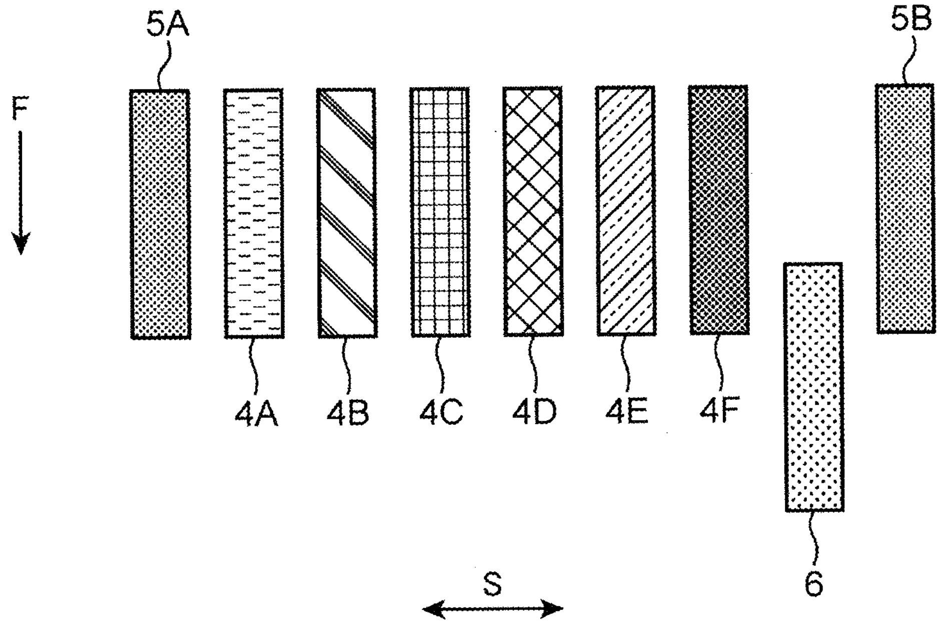
FIG. 21 is a plan view schematically showing arrangement of ink heads and processing heads on a carriage in another inkjet recording device compared with each embodiment of the present disclosure.

Next, head arrangement on a carriage in another inkjet recording device compared with the inkjet printer 1 according to each embodiment of the present disclosure will be described. FIG. 21 is a plan view schematically showing arrangement of ink heads and processing heads on the carriage in another inkjet recording device described above.

Problems based on each of the phenomena described in FIGS. 18 to 20 as described above are remarkable when the pre-processing solution 5M, the ink 4M, and the post-processing solution 6M land on a prescribed pixel on the workpiece W by different scan (movement of carriage 3). The head arrangement according to each of the above embodiments can suitably solve such problems.

Meanwhile, in the example shown in FIG. 21, two pre-processing heads 5A and 5B are arranged on both sides of the plurality of ink heads 4 (4A to 4F) in the main scanning direction S, and the post-processing head 6 is arranged on the downstream side of these heads in the conveyance direction F. In such a case, within a scan of the carriage 3 in the prescribed direction, the pre-processing head 5A or 5B can eject and land the pre-processing solution 5M, and each ink head 4 can eject and land the ink 4M. Then, in the next scan of the carriage 3, the post-processing head 6 can eject and land the post-processing solution 6M. In this case, since the ink 4M lands while the pre-processing solution 5M is permeating the fibers of the workpiece W, even if there is a deviation or bleeding when the post-processing solution 6M lands after that, the action of the pigment of the ink 4M penetrating deep into the fibers is less likely to occur than in the case where the ink 4M lands after the permeation of the pre-processing solution 5M subsides. However, in the example shown in FIG. 21 as well, when executing bi-directional printing, at the end of the main scanning direction S where the movement direction of the carriage 3 switches, because of the short time interval between the landing of the ink 4M and the landing of the post-processing solution 6M, there is a concern that the above-described decrease in the image density will occur. However, since the ink 4M and the pre-processing solution 5M have already landed at shorter time intervals within the same scan as described above, a decrease in the image density due to direct interaction between the pre-processing solution 5M and the post-processing solution 6M is unlikely to occur. That is, in the arrangement shown in FIG. 21, the problem of the decrease in pixel density, described with reference to FIG. 19, does not substantially occur.

REFERENCE SIGNS

1 inkjet printer (ink head type recording device)
16 timing belt (moving member)
17 guide rail (holding member)
20 workpiece conveyance unit (conveyance unit)
3, 3A to 3E carriage
31 head support frame
32 back frame
4 ink head
4A to 4F first to sixth ink heads
5 pre-processing head (processing head)
6 post-processing head (processing head)
7 sub-tank
71 pre-processing solution sub-tank
72 post-processing solution sub-tank
7A to 7F ink sub-tanks
90 control unit
901 drive control unit
902 ejection control unit
903 ejection pattern designation unit (ejection head designation unit)
904 storage unit
F conveyance direction
H1 upstream ink head
H2 downstream ink head
S main scanning direction
W workpiece (recording medium)

The invention claimed is:

1. An inkjet recording device, comprising:
a conveyance unit configured to convey a recording medium in a conveyance direction;
a carriage configured to reciprocate in a main scanning direction intersecting the conveyance direction;
a plurality of ink heads located on the carriage, each ink head configured to eject an ink;
at least one pre-processing head arranged upstream of the plurality of ink heads in the conveyance direction and configured to eject a non-colored pre-processing solution; and
at least one post-processing head arranged downstream of the plurality of ink heads in the conveyance direction and configured to eject a non-colored post-processing solution, wherein
the plurality of ink heads includes a plurality of same-color ink heads arranged to align in the conveyance direction and configured to eject a same-color ink,
when the plurality of same-color ink heads is set as one set of same-color ink heads, the plurality of ink heads includes a plurality of sets of same-color ink heads arranged to align in the main scanning direction and configured to eject the ink of colors different from each other,
the plurality of sets of same-color ink heads each include:
a downstream ink head arranged at a position closest to the post-processing head in the conveyance direction; and
at least one upstream ink head arranged between the pre-processing head and the downstream ink head in the conveyance direction, and
the at least one post-processing head is arranged such that part of the head overlaps with a plurality of the downstream ink heads included in the plurality of sets of same-color ink heads in the conveyance direction, and is arranged at an identical position to one upstream ink head among the plurality of the upstream ink heads included in the plurality of sets of same-color ink heads in the main scanning direction.

2. The inkjet recording device according to claim 1, wherein
the plurality of same-color ink heads is arranged at positions different from each other in the main scanning direction and is partially overlapped each other in the conveyance direction.

3. The inkjet recording device according to claim 1, wherein
the at least one post-processing head is arranged outside an arrangement range of a plurality of the downstream ink heads included in the plurality of sets of the same-color ink heads in the main scanning direction.

4. The inkjet recording device according to claim 1, wherein
the at least one post-processing head includes a plurality of the post-processing heads arranged at positions different from each other in the main scanning direction, and
the plurality of post-processing heads includes:
a first post-processing head arranged outside an arrangement range of a plurality of the downstream ink heads included in the plurality of sets of the same-color ink heads in the main scanning direction; and
at least one second post-processing head arranged such that part of the head enters between one pair of downstream ink heads adjacent to each other in the main scanning direction out of the plurality of the downstream ink heads, and arranged to align with the first post-processing head in the main scanning direction.

5. The inkjet recording device according to claim 1, further comprising a holding member configured to hold the carriage in a state where reciprocation is possible in the main scanning direction, wherein the carriage includes an engagement unit and is held by the engagement unit in a cantilevered state on the holding member, and the pre-processing head is arranged closer to the engagement unit than the post-processing head in the conveyance direction.

6. The inkjet recording device according to claim 1, further comprising a holding member configured to hold the carriage in a state where reciprocation is possible in the main scanning direction, wherein the carriage includes an engagement unit and is held by the engagement unit in a cantilevered state on the holding member, and out of the pre-processing head and the post-processing head, the head with a smaller number of heads is arranged on the engagement unit side of the carriage.

7. The inkjet recording device according to claim 1, further comprising a holding member configured to hold the carriage in a state where reciprocation is possible in the main scanning direction, wherein the carriage includes an engagement unit and is held by the engagement unit in a cantilevered state on the holding member, and out of the pre-processing head and the post-processing head, the head arranged on a side of the carriage closest to the engagement unit is arranged at a position except for an end of the main scanning direction in a head array of the pre-processing head, the ink heads, and the post-processing head.

8. The inkjet recording device according to claim 1, wherein the plurality of same-color ink heads includes n (n is an integer equal to or greater than 2) same-color ink heads arranged at positions different from each other in the conveyance direction, the inkjet recording device further comprises an ejection head designation unit configured to designate an ejection ink head that is an ink head ejecting the ink from among the n same-color ink heads, and configured to land the ink at a position on the recording medium based on an image information, and the ejection head designation unit is configured to, in response to ejecting the ink from n−1 or less same-color ink heads based on the image information, designate the ejection ink head such that the ink is ejected from the upstream ink head and the ink is not ejected from the downstream ink head, among the n same-color ink heads.

9. The inkjet recording device according to claim 1, wherein all of the ejection to land the same-color ink at a position on the recording medium based on an image information is either ejection to eject the ink from the upstream ink head and not to eject the ink from the downstream ink head, or ejection to eject the ink from each of the upstream ink head and the downstream ink head.

10. An inkjet recording device, comprising:

a conveyance unit configured to convey a recording medium in a conveyance direction;

a carriage configured to reciprocate in a main scanning direction intersecting the conveyance direction;

a plurality of ink heads located on the carriage, each ink head configured to eject an ink;

at least one pre-processing head arranged upstream of the plurality of ink heads in the conveyance direction and configured to eject a non-colored pre-processing solution; and at least one post-processing head arranged downstream of the plurality of ink heads in the conveyance direction and configured to eject a non-colored post-processing solution, wherein the plurality of ink heads includes a plurality of same-color ink heads arranged to align in the conveyance direction and configured to eject a same-color ink, both of the at least one pre-processing head and the at least one post-processing head are arranged to overlap with one of the plurality of ink heads in the main scanning direction, and the plurality of same-color ink heads is arranged at positions different from each other in the main scanning direction and is partially overlapped each other in the conveyance direction.

11. The inkjet recording device according to claim 10, further comprising a holding member configured to hold the carriage in a state where reciprocation is possible in the main scanning direction, wherein the carriage includes an engagement unit and is held by the engagement unit in a cantilevered state on the holding member, and the pre-processing head is arranged closer to the engagement unit than the post-processing head in the conveyance direction.

12. The inkjet recording device according to claim 10, further comprising a holding member configured to hold the carriage in a state where reciprocation is possible in the main scanning direction, wherein the carriage includes an engagement unit and is held by the engagement unit in a cantilevered state on the holding member, and out of the pre-processing head and the post-processing head, the head with a smaller number of heads is arranged on the engagement unit side of the carriage.

13. The inkjet recording device according to claim 10, further comprising a holding member configured to hold the carriage in a state where reciprocation is possible in the main scanning direction, wherein the carriage includes an engagement unit and is held by the engagement unit in a cantilevered state on the holding member, and out of the pre-processing head and the post-processing head, the head arranged on a side of the carriage closest to the engagement unit is arranged at a position except for an end of the main scanning direction in a head array of the pre-processing head, the ink heads, and the post-processing head.

14. The inkjet recording device according to claim 10, wherein the plurality of same-color ink heads includes n (n is an integer equal to or greater than 2) same-color ink heads arranged at positions different from each other in the conveyance direction, the inkjet recording device further comprises an ejection head designation unit configured to designate an ejection ink head that is an ink head ejecting the ink from among the n same-color ink heads, and configured to land the ink at a position on the recording medium based on an image information, and the ejection head designation unit is configured to, in response to ejecting the ink from n−1 or less same-color ink heads based on the image information, designate the ejection ink head such that the ink is ejected from the upstream ink head and the ink is not ejected from the downstream ink head, among the n same-color ink heads.

15. The inkjet recording device according to claim 10, wherein all of the ejection to land the same-color ink at a position on the recording medium based on an image information is either ejection to eject the ink from the upstream ink head and not to eject the ink from the downstream ink head, or ejection to eject the ink from each of the upstream ink head and the downstream ink head.

16. An inkjet recording device, comprising:

a conveyance unit configured to convey a recording medium in a conveyance direction;

a carriage configured to reciprocate in a main scanning direction intersecting the conveyance direction;

a plurality of ink heads located on the carriage, each ink head configured to eject an ink;

at least one pre-processing head arranged upstream of the plurality of ink heads in the conveyance direction and configured to eject a non-colored pre-processing solution; and at least one post-processing head arranged downstream of the plurality of ink heads in the conveyance direction and configured to eject a non-colored post-processing solution, wherein the plurality of ink heads includes a plurality of same-color ink heads arranged to align in the conveyance direction and configured to eject a same-color ink, both of the at least one pre-processing head and the at least one post-processing head are arranged within an arrangement range of the plurality of ink heads in the main scanning direction, and the plurality of same-color ink heads is arranged at positions different from each other in the main scanning direction and is partially overlapped each other in the conveyance direction.

17. The inkjet recording device according to claim 16, further comprising a holding member configured to hold the carriage in a state where reciprocation is possible in the main scanning direction, wherein the carriage includes an engagement unit and is held by the engagement unit in a cantilevered state on the holding member, and the pre-processing head is arranged closer to the engagement unit than the post-processing head in the conveyance direction.

18. The inkjet recording device according to claim 16, further comprising a holding member configured to hold the carriage in a state where reciprocation is possible in the main scanning direction, wherein the carriage includes an engagement unit and is held by the engagement unit in a cantilevered state on the holding member, and out of the pre-processing head and the post-processing head, the head with a smaller number of heads is arranged on the engagement unit side of the carriage.

19. The inkjet recording device according to claim 16, further comprising a holding member configured to hold the carriage in a state where reciprocation is possible in the main scanning direction, wherein the carriage includes an engagement unit and is held by the engagement unit in a cantilevered state on the holding member, and out of the pre-processing head and the post-processing head, the head arranged on a side of the carriage closest to the engagement unit is arranged at a position except for an end of the main scanning direction in a head array of the pre-processing head, the ink heads, and the post-processing head.

20. The inkjet recording device according to claim 16, wherein the plurality of same-color ink heads includes n (n is an integer equal to or greater than 2) same-color ink heads arranged at positions different from each other in the conveyance direction, the inkjet recording device further comprises an ejection head designation unit configured to designate an ejection ink head that is an ink head ejecting the ink from among the n same-color ink heads, and configured to land the ink at a position on the recording medium based on an image information, and the ejection head designation unit is configured to, in response to ejecting the ink from n−1 or less same-color ink heads based on the image information, designate the ejection ink head such that the ink is ejected from the upstream ink head and the ink is not ejected from the downstream ink head, among the n same-color ink heads.

21. The inkjet recording device according to claim 16, wherein all of the ejection to land the same-color ink at a position on the recording medium based on an image information is either ejection to eject the ink from the upstream ink head and not to eject the ink from the downstream ink head, or ejection to eject the ink from each of the upstream ink head and the downstream ink head.

* * * * *